US012614345B2

(12) United States Patent
Stengel et al.

(10) Patent No.: US 12,614,345 B2
(45) Date of Patent: \*Apr. 28, 2026

(54) STREAMING A COMPRESSED LIGHT FIELD

(71) Applicant: NVIDIA Corporation, Santa Clara, CA (US)

(72) Inventors: Michael Stengel, Cupertino, CA (US); Alexander Majercik, San Francisco, CA (US); Ben Boudaoud, Efland, NC (US); Morgan McGuire, Williamstown, MA (US)

(73) Assignee: NVIDIA CORPORATION, Santa Clara, CA (US)

( \* ) Notice: Subject to any disclaimer, the term of this patent is extended or adjusted under 35 U.S.C. 154(b) by 12 days.

This patent is subject to a terminal disclaimer.

(21) Appl. No.: 18/545,911

(22) Filed: Dec. 19, 2023

(65) Prior Publication Data

US 2024/0119664 A1 Apr. 11, 2024

Related U.S. Application Data

(63) Continuation of application No. 17/177,011, filed on Feb. 16, 2021, now Pat. No. 11,941,752.
(Continued)

(51) Int. Cl.
*G06T 15/50* (2011.01)
*G06T 15/04* (2011.01)
(Continued)

(52) U.S. Cl.
CPC ............ *G06T 15/506* (2013.01); *G06T 15/04* (2013.01); *G06T 15/06* (2013.01); *H04L 67/131* (2022.05); *H04N 19/46* (2014.11)

(58) Field of Classification Search
CPC ....... G06T 15/04; G06T 15/06; G06T 15/506; H04N 19/46; H04N 19/597; H04L 67/131; A63F 13/355
See application file for complete search history.

(56) References Cited

U.S. PATENT DOCUMENTS 6,567,083 B1 5/2003 Baum et al.
7,995,059 B1 8/2011 Arvo
(Continued)

FOREIGN PATENT DOCUMENTS

CN 101458824 A 6/2009
CN 105263050 A 1/2016
(Continued)

OTHER PUBLICATIONS

Slater M, Mortensen J, Khanna p. Yu I. A virtual light field approach to global illumination. In Proceedings Computer Graphics International, 2004. Jun. 19, 2004 (pp. 102-109). IEEE. (Year: 2004).\*
(Continued)

*Primary Examiner* — King Y Poon
*Assistant Examiner* — Vincent Peren
(74) *Attorney, Agent, or Firm* — Zilka-Kotab, P.C.

(57) ABSTRACT

A remote device utilizes ray tracing to compute a light field for a scene to be rendered, where the light field includes information about light reflected off surfaces within the scene. This light field is then compressed utilizing one or more video compression techniques that implement temporal reuse, such that only differences between the light field for the scene and a light field for a previous scene are compressed. The compressed light field data is then sent to a client device that decompresses the light field data and uses such data to obtain the light field for the scene at the client device. This light field is then used by the client device to compute global illumination for the scene. The global illu-
(Continued)

mination may be used to accurately render the scene at the mobile device, resulting in a realistic scene that is presented by the mobile device.

25 Claims, 12 Drawing Sheets

Related U.S. Application Data

(60) Provisional application No. 63/054,681, filed on Jul. 21, 2020.

(51) Int. Cl.
| | |
|---|---|
| *G06T 15/06* | (2011.01) |
| *H04L 67/131* | (2022.01) |
| *H04N 19/46* | (2014.01) |

(56) References Cited

U.S. PATENT DOCUMENTS

| | | | |
|---|---|---|---|
| 8,147,339 | B1 | 4/2012 | Perry |
| 8,587,588 | B2 | 11/2013 | Smyth |
| 10,008,034 | B2 | 6/2018 | McGuire et al. |
| 10,262,451 | B1 * | 4/2019 | Chou .................... G06T 15/205 |
| 10,713,838 | B2 | 7/2020 | McGuire et al. |
| 11,501,467 | B2 | 11/2022 | Stengel et al. |
| 2001/0037402 | A1 | 11/2001 | Schneider |
| 2005/0041024 | A1 | 2/2005 | Green et al. |
| 2006/0066616 | A1 | 3/2006 | Sevastianov et al. |
| 2007/0139433 | A1 | 6/2007 | Anderson et al. |
| 2007/0229502 | A1 | 10/2007 | Tong et al. |
| 2008/0018647 | A1 | 1/2008 | Bunnell |
| 2008/0143720 | A1 | 6/2008 | Elmquist |
| 2008/0207322 | A1 | 8/2008 | Mizrahi |
| 2009/0167763 | A1 | 7/2009 | Waechter et al. |
| 2009/0254293 | A1 | 10/2009 | Tartaglia et al. |
| 2010/0033493 | A1 | 2/2010 | Nutter et al. |
| 2010/0315423 | A1 | 12/2010 | Ahn et al. |
| 2011/0012901 | A1 | 1/2011 | Kaplanyan |
| 2011/0043523 | A1 | 2/2011 | Kim et al. |
| 2011/0122135 | A1 | 5/2011 | Kim et al. |
| 2011/0175913 | A1 | 7/2011 | Sloan et al. |
| 2012/0114037 | A1 | 5/2012 | Winder et al. |
| 2012/0212491 | A1 | 8/2012 | Hager |
| 2012/0256915 | A1 | 10/2012 | Jenkins |
| 2012/0313944 | A1 | 12/2012 | Kontkanen et al. |
| 2013/0038618 | A1 | 2/2013 | Urbach |
| 2013/0113800 | A1 | 5/2013 | McCombe et al. |
| 2013/0120385 | A1 | 5/2013 | Krishnaswamy et al. |
| 2013/0137511 | A1 | 5/2013 | Bae et al. |
| 2013/0321417 | A1 | 12/2013 | Van Den Berghe et al. |
| 2013/0335434 | A1 | 12/2013 | Wang et al. |
| 2014/0035900 | A1 | 2/2014 | Slavin, III et al. |
| 2014/0139513 | A1 | 5/2014 | Mammou |
| 2014/0173674 | A1 | 6/2014 | Wolman et al. |
| 2014/0232719 | A1 | 8/2014 | Wahrenberg |
| 2014/0267271 | A1 | 9/2014 | Billeter et al. |
| 2014/0285499 | A1 | 9/2014 | Iwasaki |
| 2014/0327690 | A1 * | 11/2014 | McGuire ............... G06T 15/005 |
| | | | 345/589 |
| 2014/0375659 | A1 | 12/2014 | Mcguire et al. |
| 2015/0325035 | A1 | 11/2015 | Howell |
| 2018/0081429 | A1 * | 3/2018 | Akenine-Moller ..... G06F 3/013 |
| 2018/0278939 | A1 | 9/2018 | Abercrombie |
| 2018/0322691 | A1 | 11/2018 | Mitchell et al. |
| 2019/0166359 | A1 | 5/2019 | Lapstun |
| 2019/0236831 | A1 | 8/2019 | Akenine-Moller et al. |
| 2020/0275074 | A1 | 8/2020 | Hamilton et al. |
| 2020/0312018 | A1 | 10/2020 | McGuire et al. |
| 2022/0028158 | A1 | 1/2022 | Stengel et al. |
| 2022/0138988 | A1 | 5/2022 | Stengel et al. |

FOREIGN PATENT DOCUMENTS

| | | |
|---|---|---|
| CN | 106662749 A | 5/2017 |
| CN | 109564704 A | 4/2019 |
| CN | 110024002 A | 7/2019 |
| CN | 110728740 A | 1/2020 |
| JP | 2012004636 A | 1/2012 |

OTHER PUBLICATIONS

Hajisharif S, Miandji E, Larsson p. Tran K, Unger J. Light field video compression and real time rendering. In Computer Graphics Forum Oct. 2019 (vol. 38, No. 7, pp. 265-276). (Year: 2019).*

Chan SC, Ng KT, Gan ZF, Chan KL, Shum HY. The plenoptic video. IEEE Transactions on Circuits and Systems for Video Technology. Dec. 31, 2005; 15(12):1650-9. (Year: 2005).*

Liu Y, Dai Q, Xu W. A real time interactive dynamic light field transmission system. In2006 IEEE International Conference on Multimedia and Expo Jul. 9, 2006 (pp. 2173-2176). IEEE. (Year: 2006).*

Han Z, Dai Q. A new scalable free viewpoint video streaming system over IP network. In2007 IEEE International Conference on Acoustics, Speech and Signal Processing-ICASSP'07 Apr. 15, 2007 (vol. 2, pp. II-773). IEEE. (Year: 2007).*

Cai W, Cheung G, Kwon T, Lee SJ. Optimized frame structure for interactive light field streaming with cooperative caching. In2011 IEEE International Conference on Multimedia and Expo Jul. 11, 2011 (pp. 1-6). IEEE. (Year: 2011).*

Kovács PT, Zare A, Balogh T, Bregovic R, Gotchev A. Architectures and codecs for real-time light field streaming. Journal of Imaging Science and Technology. Jan. 1, 2017;61(1):010403. (Year: 2017).*

Hattachi et al., "NGMN 5G White Paper," NGMN Alliance, Feb. 17, 2015, 125 pages.

Bugeja et al., "An asynchronous method for cloud-based rendering," The Visual Computer, Dec. 2019, 15 pages.

Bierton, D., "Face-off: Gaikai vs. OnLive," Eurogamer, Mar. 24, 2012, 17 pages, retrieved from https://www.eurogamer.net/articles/digitalfoundry-face-off-gaikai-vs-onlive.

Chen et al., "A Framework for Adaptive Residual Streaming for Single-Player Cloud Gaming," ACM Transactions on Multimedia Computing, Communications and Applications, vol. 15, No. 2s, No. 66, Jul. 2019, 23 pages.

Collet et al., "Zstandard Compression and the application/zstd Media Type," RFC 8478, Internet Engineering Task Force (IETF), Oct. 2018, 55 pages.

Crassin et al., "CloudLight: A System for Amortizing Indirect Lighting in Real-Time Rendering," Journal of Computer Graphics Techniques vol. 4, No. 4, 2015, pp. 1-27.

Choy et al., "The Brewing Storm in Cloud Gaming: A Measurement Study on Cloud to End-User Latency," NetGames 2012: The 11th ACM Annual Workshop on Network and Systems Support for Games, Nov. 2012, 8 pages.

Dayal et al., "Adaptive Frameless Rendering," Eurographics Symposium on Rendering, Jan. 2005, 12 pages.

Enet, "Enet Reliable UDP networking library," Enet, v1.3.17, 2020, 1 page, retrieved from http://enet.bespin.org/.

Geutskens, Y., "The HDR Ecosystem Tracker (mid-2019)," flatpanelshd, Jun. 4, 2019, 18 pages, retrieved from https://www.flatpanelshd.com/focus.php?subaction=showfull&id=1559638820.

Google, "Bandwidth, data usage, and stream quality," Google, Stadia Help, 2021, 3 pages, retrieved from https://support.google.com/stadia/answer/9607891?hl=en.

GPD, "GPD WIN 2," GPD GamePod Digital, 2018, 15 pages, retrieved from https://www.gpd.hk/gdpwin2.

Greger et al., "The irradiance volume," IEEE Computer Graphics and Applications, vol. 18, 1998, 21 pages, retrieved from https://www.researchgate.net/publication/3208677_The_Irradiance_Volume.

Jansen et al., "5G vs. 4G: How will the newest network improve on the last?" digitaltrends, Feb. 26, 2021, 11 pages, retrieved from https://www.digitaltrends.com/mobile/5g-vs-4g/.

(56) References Cited

OTHER PUBLICATIONS

Hladky et al., "The Camera Offset Space: Real-time Potentially Visible Set Computations for Streaming Rendering," ACM Transactions on Graphics, vol. 38, No. 6, Nov. 2019, pp. 231:1-231:14.
Hladky et al., "Tessellated Shading Streaming," Eurographics Symposium on Rendering, vol. 38, No. 4, 2019, 13 pages.
HDR10+, "HDR10+ System Whitepaper," HDR10+ Technologies, LLC, Sep. 4, 2019, 14 pages.
Hillesland et al., "Texel shading," Eurographics Proceedings, 2016, 4 pages, retrieved from https://gpuopen.com/learn/texel-shading/.
Koroneos et al., "Customers in Chicago and Minneapolis are first in the world to get 5g-enabled smartphones connected to a 5g network," Verizon, Apr. 3, 2019, 4 pages, retrieved from https://www.verizon.com/about/news/customers-chicago-and-minneapolis-are-first-world-get-5g-enabled-smartphones-connected-5g.
Liu et al., "Hybrid Lossless-Lossy Compression for Real-Time Depth-Sensor Streams in 3D Telepresence Applications," Pacific Rim Conference on Multimedia, 2015, 10 pages, retrieved from https://www.semanticscholar.org/paper/Hybrid-Lossless-Lossy-Compression-for-Real-Time-in-Liu-Beck/f682a8eca52ea0531b7d58573e6a47871cf45a46.
Levoy, M., "Polygon-Assisted JPEG and MPEG Compression of Synthetic Images," Proceedings of the 22nd Annual Conference on Computer Graphics and Interactive Techniques, 1995, pp. 21-28.
Lindstrom, P., "Fixed-Rate Compressed Floating-Point Arrays," IEEE Transactions on Visualization and Computer Graphics, Aug. 2014, 11 pages.
Mcgarry, C., "5G speed: 5G vs 4G performance compared," tom's guide, 2021, 20 pages, retrieved from https://www.tomsguide.com/features/5g-vs-4g.
Majercik et al., "Dynamic Diffuse Global Illumination with Ray-Traced Irradiance Fields," Journal of Computer Graphics Techniques vol. 8, No. 2, 2019, pp. 1-30.
Morgan, T., "Doom Eternal on Stadia looks great—but the lag is just too high," Eurogamer, Mar. 2020, 9 pages, retrieved from https://www.eurogamer.net/articles/digitalfoundry-2020-doom-eternal-stadia-looks-the-part-but-lag-is-too-high.
Mueller et al., "Shading Atlas Streaming," ACM Transactions on Graphics, vol. 37, No. 6, Nov. 2018, pp. 199:1-199:16.
Nystad et al., "Adaptive Scalable Texture Compression," High Performance Graphics, 2012, pp. 105-114.
NVIDIA, "Video Encode and Decode GPU Support Matrix," NVIDIA Developer, 2021, 1 page, retrieved from https://developer.nvidia.com/video-encode-and-decode-gpu-support-matrix-new.
NVIDIA, "Geforce Now System Requirements," NVIDIA, 2021, 6 pages, retrieved from https://www.nvidia.com/en-us/geforce-now/system-reqs/.
NVIDIA, "Jetson Xavier Nx," NVIDIA Developer, 2021, 4 pages, retrieved from https://developer.nvidia.com/embedded/jetson-xavier-nx.
Speedtest, "Speedtest Global Index," Speedtest, 2021, 13 pages, retrieved https://www.speedtest.net/reports/united-states/#mobile.
Pajak et al., "Scalable Remote Rendering with Depth and Motion-flow Augmented Streaming," Eurographics, vol. 30, No. 2, 2011, 10 pages.
Qualcomm, "Snapdragon 865 5G Mobile Platform," Qualcomm, 2021, 12 pages, retrieved from https://www.qualcomm.com/products/snapdragon-865-5g-mobile-platform.
Richardson et al., "The Remote Framebuffer Protocol," Internet Engineering Task Force, RFC 6143, Mar. 2011, pp. 1-40.
Scherzer et al., "Pre-convolved Radiance Caching," Eurographics, vol. 31, No. 4, 2012, 7 pages.
Sullivan et al., "Overview of the High Efficiency Video Coding (HEVC) Standard," IEEE Transactions on Circuits and Systems for Video Technology, vol. 22, No. 12, Dec. 2012, pp. 1649-1668.
Schwarz et al., "Emerging MPEG Standards for Point Cloud Compression," IEEE Journal on Emerging and Selected Topics in Circuits and Systems, vol. 9, No. 1, Mar. 2019, pp. 133-148.
Tom's Guide Staff, "Fastest wireless network 2020: It's not even close," tom's guide, Dec. 6, 2019, pp. 1-19.

Stereolabs, "H.264/H.265 Video Encoding Support Matrix for Nvidia Jetson," stereolabs.com, 2020, 5 pages, retrieved from https://www.stereolabs.com/blog/h-264-h-265-video-encoding-support-matrix-for-nvidia-jetson/.
Suvorov, A., "Crunch compression of ETC textures," Unity Blog, Dec. 15, 2017, 31 pages, retrieved from https://blogs.unity3d.com/2017/12/15/crunch-compression-of-etc-textures/.
Van Waveren et al., "Real-Time YCoCg-DXT Compression," NVIDIA, Sep. 14, 2007, 53 pages, retrieved from https://developer.download.nvidia.com/whitepapers/2007/Real-Time-YCoCg-DXT-Compression/Real-Time%20YCoCg-DXT%20Compression.pdf.
Wilson, A., "Fast Lossless Depth Image Compression," ACM International Conference on Interactive Surfaces, 2017, pp. 100-105.
Zabriskie, N., "NetLight: Cloud Baked Indirect Illumination," Thesis, Brigham Young University, 37 pages, retrieved from https://scholarsarchive.byu.edu/cgi/viewcontent.cgi?article=8031&context=etd.
Magro et al., "Interactive Cloud-based Global Illumination for Shared Virtual Environments," IEEE 11th International Conference on Virtual Worlds and Games for Serious Applications (VS-Games), 2019, 8 pages.
Schelkens et al., "JPEG2000 Part 10—Volumetric Data Encoding," IEEE ISCAS, 2006, pp. 3874-3877.
Leaf et al., "In Situ Video Encoding of Floating-Point Volume Data Using Special-Purpose Hardware for a Posteriori Rendering and Analysis," IEEE Symposium on Large Data Analysis and Visualization, 2017, pp. 64-73.
Gamito et al., "Lossless Coding of Floating Point Data with JPEG 2000 Part 10," Proceedings of SPIE, The International Society for Optical Engineering, Nov. 2004, 13 pages.
Stengel et al., U.S. Appl. No. 17/177,011, filed Feb. 16, 2021.
Stengel et al., U.S. Appl. No. 17/308,893, filed May 5, 2021.
Mcguire et al., U.S. Appl. No. 14/270,252, filed May 5, 2014.
Ziv et al., "Compression of Individual Sequences via Variable-Rate Coding," IEEE Transactions on Information Theory, vol. IT-24, No. 5, Sep. 1978, pp. 530-536.
Non-Final Office Action from U.S. Appl. No. 17/308,893, dated May 23, 2022.
Non-Final Office Action from U.S. Appl. No. 17/177,011, dated Sep. 20, 2023.
Whitted, T., "An improved illumination model for shaded display," ACM SIGGRAPH Computer Graphics, vol. 13, Issue 2, Aug. 1979, pp. 1-6.
Akeley et al., "Minimum triangle Separation for Correct Z-Buffer Occlusion," Graphics Hardware, Eurographics Association, 2006, pp. 27-30.
Akenine-Moller et al., "Real-time rendering," 3rd Edition, A. K. Peters, Ltd., 2008, pp. 1-1027.
Arikan et al., "Fast and detailed approximate global illumination by irradiance decomposition," Computer Graphics Proceedings, Annual Conference Series, 2005, pp. 1108-1114.
Bavoil et al., "Multi-Layer Dual-Resolution Screen-Space Ambient Occlusion," SIGGRAPH 2009 Talks, Article 45, Aug. 2009, p. 1.
Blinn et al., "Texture and reflection in computer generated images," Graphics Image Processing, Communications of the ACM, vol. 19, No. 10, Oct. 1976, pp. 542-547.
Filion et al., "Effects & Techniques," STARCRAFT, Advances in Real-Time Rendering in 3D Graphics and Games Course, SIGGRAPH 2008 Games, Aug. 2008, Chapter 5, pp. 133-164.
Green et al., "Efficient Self-Shadowed Radiosity Normal Mapping," Vlave, 2007, pp. 1-4.
Greene, N., "Environment Mapping and Other Applications of World Projections," Computer Graphics and Applications, IEEE, vol. 6, No. 11, Nov. 1986, pp. 21-29.
Hoang et al., "Efficient screen-space approach to high-quality multiscale ambient occlusion," The Visual Computer: International Journal of Computer Graphics, vol. 28, Issue 3, Mar. 2012, pp. 289-304.
Immel, et al., "A Radiosity Method For Non-Diffuse Environments," ACM SIGGRAPH Computer Graphics, vol. 20, No. 4, Aug. 18-22, 1986, pp. 133-142.

(56)            References Cited

OTHER PUBLICATIONS

Jensen, H., "Global Illumination Using Photon Maps," Proceedings of the Seventh Eurographics Workshop on Rendering, 1996, pp. 21-30, pp. 1-17.

Kajiya, J.T., "The Rendering Equation," ACM SIGGRAPH Computer Graphics, vol. 20, No. 4, Aug. 18-22, 1986, pp. 143-150.

Kaplanyan, A., "CryENGINE 3: Reaching the speed of light," SIGGRAPH 2010 Courses, Los Angeles, CA, ACM, Sep. 17, 2010, 99 slides.

King, G., "Real-Time Computation of Dynamic Irradiance Environment Maps," GPU Gems 2, Apr. 2005, pp. 1-14, retrieved from http.developer.nvidia.com/GPUGems2/gpugems2_chapter10.html.

Lafortune, E., "Mathematical Models and Monte Carlo Algorithms for Physically Based Rendering," Department of Computer Science, Faculty of Engineering, Katholieke Universiteit Leuven, 1996, pp. 1-142.

Lapidous et al., "Optimal Depth Buffer for Low-Cost Graphics Hardware," Eurographics, 1999, pp. 67-73.

Levoy, M., "Polygon-Assisted JPEG and MPEG Compression of Synthetic Images," Proceedings of the 22nd Annual Conference on Computer Graphics and Interactive Techniques, SIGGRAPH '95, Sep. 1995, pp. 21-28.

Loos et al., "Volumetric Obscurance," Proceedings of the 2010 ACM SIGGRAPH Symposium on Interactive 3D Graphics and Games, Feb. 2010, pp. 151-156.

Mcguire, M., "Ambient Occlusion Volumes," Proceedings of the Conference on High Performance Graphics, Eurographics Association, Jun. 2010, 9 pages.

Mcguire et al., "The Alchemy Screen-Space Ambient Obscurance Algorithm," Proceedings of the ACM SIGGRAPH Symposium on High Performance Graphics, Aug. 2011, pp. 25-32.

Mctaggart, G., "Half-life 2 / Valve Source Shading," Direct3D Tutorial Day, Game Developers Conference, Valve Corporation, Mar. 22, 2004, 97 slides, retrieved from http://www.valvesoftware.com/publications/2004/GDC2004_Half-Life2_Shading.pdf.

Miller et al., "Illumination and Reflection Maps: Simulated Objects in Simulated and Real Environments," SIGGRAPH 84, Course Notes for Advanced Computer Graphics Animation, Jul. 23, 1984, pp. 1-12.

Mittring, M., "Finding next gen: CryEngine 2," Advanced Real-Time Rendering in 3D Graphics and Games Course—SIGGRAPH 2007, Aug. 2007, CRYTEK, Chapter 8, pp. 97-121.

Mcguire et al., "Scalable Ambient Obscurance," Proceedings of the Fourth ACM SIGGRAPH/ Eurographics Conference on High-Performance Graphics, Eurographics Association, Jun. 2012, pp. 97-103.

Nicodemus et al., "Geometrical Considerations and Nomenclature for Reflectance," Institute for Basic Standards, National Bureau of Standards, U.S. Dept of Commerce, Oct. 1977, 67 pages.

Noguera et al., "Navigating large terrains using commodity mobile devices," Computers and Geosciences, vol. 37, No. 9, Sep. 2011, pp. 1218-1233.

NVIDIA, "GPU Gems 2," NVIDIA Developer, Apr. 2005, 25 pages, retrieved from https://developer.nvidia.com/gpugems/gpugems2/copyright.

Ramamoorthi et al., "An Efficient Representation for Irradiance Environment Maps," ACM SIGGRAPH, Aug. 12-17, 2001, pp. 497-500.

Rose, M., "OnLive Works With Game Devs On Newly-Launched Tablet, Smartphone Initiative," Dec. 8, 2011, p. 1, retrieved at http://www.gamasutra.com/view/news/128588/OnLive_Works_With_Game_Devs_On_NewlyLaunched_Tablet_Smartphone_Initiative.php.

Shanmugam et al., "Hardware Accelerated Ambient Occlusion Techniques on GPUs," Proceedings of the 2007 Symposium on Interactive 3D Graphics and Games I3D, Apr. 2007, pp. 73-80.

Sloan, P.P., "Stupid Spherical Harmonics (SH) Tricks," Game Developers Conference, vol. 9, Feb. 2008, 42 pages.

Smith, A. R., "The viewing transformation," Technical Memo 84, Jun. 24, 1983, 27 pages.

Laszlo et al., "Volumetric Ambient Occlusion for Real-Time Rendering and Games," IEEE Computer Graphics and Applications, Jan. 2010, pp. 70-79.

Scheuermann et al., "Cubemap Filtering with CubeMapGen," ATI: 3D Application Research Group, Game Developers Conference Talk, 2005, 27 slides.

Upchurch et al., "Tightening the Precision of Perspective Rendering," preprint for the Journal of Graphics Tools, vol. 16, Issue 1, 2012, 6 pages.

Veach et al., "Metropolis Light Transport," Aug. 1997, pp. 65-76.

Williams, L., "Casting Curved Shadows On Curved Surfaces," ACM SIGGRAPH Computer Graphics, vol. 12, Issue 3, Aug. 1978, pp. 270-274.

Foley, J. D. et al., "A Tutorial on Satellite Graphics Systems," Computer, Aug. 1976, pp. 14-21.

Broxton et al., "Immersive Light Field Video with a Layered Mesh Representation," ACM Transactions on Graphics, vol. 39, No. 4, Jul. 2020, pp. 86:1-86:15.

Cai et al., "Toward Gaming as a Service," IEEE Internet Computing, May/Jun. 2014, pp. 12-18.

Illahi et al., "Cloud Gaming with Foveated Video Encoding," ACM Transactions on Multimedia Computing Communications and Applications, Mar. 2020, pp. 7:1-7:24.

Kamarainen et al., "CloudVR: Cloud Accelerated Interactive Mobile Virtual Reality," Proceedings of the 26th ACM international conference on Multimedia, Oct. 2018, pp. 1181-1189.

Shea et al., "Cloud Gaming: Architecture and Performance," IEEE Network, Jul./Aug. 2013, pp. 16-21.

Slivar et al., "Empirical QoE Study of In-Home Streaming of Online Games," IEEE 13th Annual Workshop on Network and Systems Support for Games, 2014, 6 pages.

Tolia et al., "Quantifying Interactive User Experience on Thin Clients," Computer, IEEE, 2006, pp. 46-52.

Liu et al., "Lightweight WebSIM Rendering Framework Based on Cloud-Baking," Proceedings of the 2017 ACM SIGSIM Conference on Principles of Advanced Discrete Simulation, 2017, pp. 221-229.

Liu et al., "Cloud Baking: Collaborative Scene Illumination for DynamicWeb3D Scenes," ACM Transactions on Multimedia Computing, Communications and Applications, vol. 14, No. 3s, Article 59, Jun. 2018, pp. 59:1-59:20.

Wijnants et al., "Standards-compliant HTTP Adaptive Streaming of Static Light Fields," Proceedings of the 24th ACM Symposium on Virtual Reality Software and Technology, 2017, 12 pages.

Matela, J., "Designing Image Compression Algorithms for Massively Parallel Processors," Masaryk University, Ph. D. Thesis, 2016, 131 pages.

Office Action from Chinese Patent Application No. 202110818935.0, dated Mar. 25, 2025, 9 pages.

Ziv et al., "A Universal Algorithm for Sequential Data Compression," IEEE Transactions on Information Theory, vol. IT-23, No. 3, May 1977, pp. 337-343.

Non-Final Office Action from U.S. Appl. No. 14/270,252, dated Sep. 24, 2015.

Final Office Action from U.S. Appl. No. 14/270,252, dated May 26, 2016.

Non-Final Office Action from U.S. Appl. No. 14/270,252, dated May 3, 2017.

Final Office Action from U.S. Appl. No. 14/270,252, dated Jan. 23, 2018.

Non-Final Office Action from U.S. Appl. No. 14/270,252, dated Sep. 20, 2018.

Final Office Action from U.S. Appl. No. 14/270,252, dated Feb. 7, 2019.

Advisory Action from U.S. Appl. No. 14/270,252, dated Jul. 3, 2019.

Non-Final Office Action from U.S. Appl. No. 14/270,252, dated Sep. 17, 2019.

Notice of Allowance from U.S. Appl. No. 14/270,252, dated Mar. 11, 2020.

Corrected Notice of Allowance from U.S. Appl. No. 14/270,252, dated Mar. 25, 2020.

(56) References Cited

OTHER PUBLICATIONS

Christensen et al., "An Irradiance Atlas for Global Illumination in Complex Production Scenes," Eurographics Symposium on Rendering, 2004, pp. 1-10.

Pacanowski et al., "Efficient Streaming of 3D Scenes with Complex Geometry and Complex Lighting," 2008, pp. 1-7.

Damez et al., "State of the Art in Global Illumination for Interactive Applications and High-quality Animations," Computer Graphics Forum, vol. 21, No. 4, 2003, pp. 55-77.

Waters, Z., "Photon Mapping," 2006, 8 pages, retrieved from https://web.cs.wpi.edu/~emmanuel/courses/cs563/write_ups/zackw/photon_mapping/PhotonMapping.html.

Xu et al., "Real-time Rendering of Dynamic Objects in Dynamic, Low-frequency Lighting Environments," Semantic Scholar, 2005, 7 pages, retrieved from https://www.semanticscholar.org/paper/Real-time-Rendering-of-Dynamic-Objects-in-Dynamic-%2C-Xu-Pattanaik/55d7974ff94a8b48dd1b324cb6230605d461170b.

Klionsky, Z., "A New Architecture for Cloud Rendering and Amortized Graphics," Thesis, Aug. 2011, 47 pages.

Wyman et al., "Interactive Display of Isosurfaces with Global Illumination," IEEE Transactions on Visualization and Computer Graphics, vol. 12, No. 2, 2006, pp. 186-196.

Meneveaux et al., "Photon Streaming for Interactive Global Illumination in Dynamic Scenes," HAL archives-ouvertes.fr, Oct. 2008, 19 pages.

Armbrust et al., "A view of cloud computing," Communications of the ACM, vol. 53, No. 4, Apr. 2010, pp. 50-58.

Boukerche et al., "Remote rendering and streaming of progressive panoramas for mobile devices," Proceedings of the 14th Annual ACM International Conference on Multimedia, Oct. 23-27, 2006, pp. 691-694.

Boulton, M., "Static lighting tricks in Halo 4," GDC Presentation, 2013, 17 slides.

Brodlie, et al., "Distributed and Collaborative Visualization," Eurographics, 2003, pp. 1-28.

Chalmers et al., "Practical Parallel Rendering," A K Peters, 2002, 392 pages.

Chang et al., "Practical Strategies for Power-Efficient Computing Technologies," Proceedings of the IEEE, vol. 98, No. 2, Feb. 2010, pp. 215-236.

Chen et al., "Measuring The Latency of Cloud Gaming Systems," In Proceedings of the 19th ACM International Conference on Multimedia, ACM, Nov. 28-Dec. 1, 2011, pp. 1269-1272.

Choy et al., "The Brewing Storm in Cloud Gaming: A Measurement Study on Cloud to End-User Latency," NetGames 2012: The 11th ACM Annual Workshop on Network and Systems Support for Games, Nov. 2012, pp. 1-7.

Cohen et al., "A progressive refinement approach to fast radiosity image generation," In ACM SIGGRAPH Computer Graphics, vol. 22, No. 4, Aug. 1988, pp. 75-84.

Crassin et al., "Interactive Indirect Illumination Using Voxel Cone Tracing," Computer Graphics Forum, Wiley-Blackwell, vol. 30, No. 7, Sep. 2011, pp. 1921-1930.

Crassin et al., "CloudLight: A system for amortizing indirect lighting in real-time rendering," NVIDIA Technical Report NVR-2013-001, Jul. 2013, pp. 1-10.

Dutre et al., "Advanced Global Illumination," SIGGRAPH 2002 Course 2, 2002, pp. 1-25.

Hu et al., "Visual Cues for Imminent Object Contact in Realistic Virtual Environment," In Proceedings of the Conference on Visualization '00, IEEE Computer Society Press, Oct. 2000, pp. 179-185.

Jensen, H. W., "Realistic Image Synthesis Using Photon Mapping," A. K. Peters, Ltd., 2001, pp. 1-181.

Karapantazis et al., "VoIP: A comprehensive survey on a promising technology," Computer Networks, vol. 53, 2009, pp. 2050-2090.

Koller et al., "Protected interactive 3D graphics via remote rendering," ACM Transactions on Graphics (TOG), Aug. 2004, vol. 23, No. 3, pp. 695-703.

Lawton, G., "Cloud Streaming Brings Video to Mobile Devices," Computer, vol. 45, Issue 2, Feb. 2012, pp. 14-16.

Loos et al., "Modular radiance transfer," ACM Transactions on Graphics (TOG), Proceedings of ACM SIGGRAPH Asia 2011, vol. 30, No. 6, Dec. 2011, Article No. 178, pp. 1-10.

Luke et al., "Semotus Visum: A Flexible Remote Visualization Framework," IEEE Visualization, Oct. 27-Nov. 1, 2002, pp. 61-68.

Manzano et al., "An empirical study of Cloud Gaming," Annual Workshop on Network and Systems Support for Games, Nov. 2012, 3 pages.

Mara, M., "Cloudlight: A Distributed Global Illumination System For Real-time Rendering," Thesis, May 13, 2012, pp. 1-62.

Mara et al., "Toward practical real-time photon mapping: efficient GPU density estimation," Proceedings of the ACM SIGGRAPH Symposium on Interactive 3D Graphics and Games, Mar. 2013, 9 pages, retrieved from https://casual-effects.com/research/Mara2013Photon/index.html.

Martin et al., "A Real-Time Radiosity Architecture for Video Games," Geomerics, Electronic Arts (EA) DICE, SIGGRAPH 2010 Courses, Slideshow, Aug. 1, 2010, 38 pages.

Mitchell et al., "Shading in Valve's Source Engine," Advanced Real-Time Rendering in 3D Graphics and Games Course—ACM SIGGRAPH 2006, Chapter 8, pp. 8-1-8-14.

Parker et al., "OptiX: A General Purpose Ray Tracing Engine," ACM Transactions on Graphics, vol. 29, No. 4, Article No. 66, Jul. 2010, 66:1-66:13.

Paul et al., "Chromium renderserver: Scalable and open remote rendering infrastructure," Visualization and Computer Graphics, IEEE Transactions, vol. 14, Issue 3, Jun. 3, 2008, pp. 627-639.

Ritschel et al., "The State Of The Art In Interactive Global Illumination," Computer Graphics forum, Blackwell Publishing Ltd., vol. 0, No. 0, 1981, pp. 1-27.

Rao et al., "Network characteristics of video streaming traffic," CoNEXT '11, Dec. 6-9, 2011, pp. 1-12.

Shi et al., "A Real-Time Remote Rendering System for Interactive Mobile Graphics," ACM Transactions on Multimedia Computing, Communications and Applications, vol. 8, No. 3s, Article 46, Sep. 2012, pp. 46:1-46:20.

Sinha et al., "Recovering reflectance and illumination in a world of painted polyhedra," Fourth International Conference on Computer Vision, May 11-14, 1993, pp. 156-163.

Suznjevic et al., "MMORPG player actions: Network performance, session patterns and latency requirements analysis," Multimedia Tools and Applications, vol. 45, No. 1-3, Oct. 2009, pp. 191-214.

Tamm et al., "Hybrid Distributed Rendering," IEEE LDAV Symposium 2012, pp. 1-2.

Second Office Action from Chinese Patent Application No. 202110818935.0, dated Oct. 29, 2025.

* cited by examiner

To/From
XBar 270

Memory Partition Unit
280

ROP 350

L2 Cache 360

To/From
XBar 270

Memory Interface
370

To/From
Memory 204

500

Input Data
501

Data Assembly
510

Vertex Shading
520

Primitive Assembly
530

Geometry Shading
540

Viewport SCC
550

Rasterization
560

Fragment Shading
570

Raster Operations
580

Output Data
502

REMOTE DEVICE

<u>804</u>

COMMUNICATIONS
NETWORK
<u>806</u>

CLIENT DEVICE

<u>802</u>

STREAMING A COMPRESSED LIGHT FIELD

CLAIM OF PRIORITY

This application is a continuation of U.S. application Ser. No. 17/177,011, filed Feb. 16, 2021, which claims the benefit of U.S. Provisional Application No. 63/054,681, filed on Jul. 21, 2020, the entire contents of which are hereby incorporated by reference in their entirety.

TECHNICAL FIELD

The present invention relates to image rendering, and more particularly to performing global illumination for a scene.

BACKGROUND

Today's high-performance graphics systems for gaming include multiple GPUS, hardware-accelerated ray tracing, and efficient algorithms and can approach cinematic rendering quality in real-time using ray traced global illumination while providing interaction latency measured in milliseconds. These high-end systems set expectations which are currently difficult to meet on lower end consumer platforms that are constrained by thermal limits, battery power, and limited GPU feature sets.

Current cloud-based graphics solutions stream the entire content as fully rendered images from a remote server to a client. On the client the video stream is decompressed and shown on the display. However, network latency, bandwidth limitations, and increasing screen resolutions and framerates threaten the viability of this approach in the future. There is therefore a need to implement a distributed rendering system with reduced bandwidth and latency characteristics.

DETAILED DESCRIPTION

A remote device (such as a server or one or more distributed computing nodes) utilizes ray tracing to compute a light field for a scene to be rendered, where the light field includes information about light reflected off surfaces within the scene. This light field is then compressed in an efficient manner utilizing one or more video compression techniques that implement temporal reuse, such that only differences between the light field for the scene and a light field for a previous scene are compressed. This minimizes the amount of data to be sent. The compressed light field data is then sent to a client device (such as a mobile computing device) that decompresses the light field data and uses such data to obtain the light field for the scene at the client device. This light field is then used by the client device to compute global illumination for the scene. The global illumination may be used to accurately render the scene at the mobile device, resulting in a realistic scene that is presented by the mobile device to one or more users.

Figure 1:
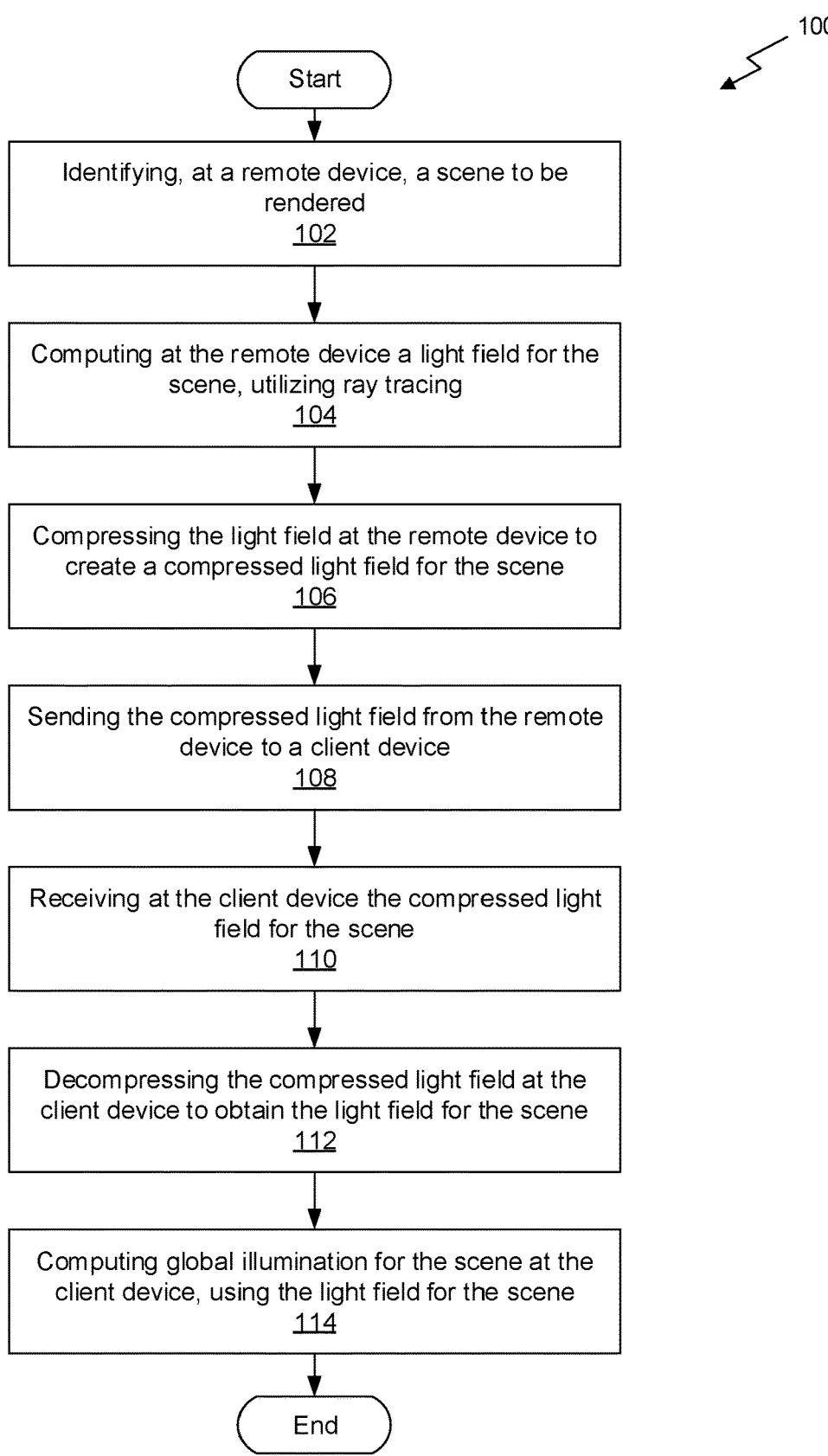
FIG. 1 illustrates a flowchart of a method for streaming a compressed light field, in accordance with an embodiment.

FIG. 1 illustrates a flowchart of a method 100 for streaming a compressed light field, in accordance with an embodiment. Although method 100 is described in the context of a processing unit, the method 100 may also be performed by a program, custom circuitry, or by a combination of custom circuitry and a program. For example, the method 100 may be executed by a GPU (graphics processing unit), CPU (central processing unit), or any processor capable of performing parallel path space filtering by hashing. Furthermore, persons of ordinary skill in the art will understand that any system that performs method 100 is within the scope and spirit of embodiments of the present invention.

It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

As shown in operation 102, a scene to be rendered is identified at a remote device. In one embodiment, the scene may include a still image, a frame within a video, a frame within a video game, etc. In another embodiment, the remote device may include a compute node within a distributed computing system, one or more nodes within a cloud-based computing environment, a server computing device, etc. In yet another embodiment, the remote device may be physically separate from a client device.

For example, the client device may display rendered scenes to one or more users (e.g., using one or more displays, etc.). In another example, the remote device and the client device may communicate via one or more wired and/or wireless communication networks (e.g., a wireless internet connection, a cellular communications network, etc.).

Additionally, as shown in operation 104, a light field for the scene is computed at the remote device, utilizing ray tracing. In one embodiment, the remote device may perform ray tracing within a scene to determine the light field for the scene. For example, the ray tracing may include tracing a path of light as pixels within an image plane and simulating the effects of its encounters with objects within the scene.

Further, in one embodiment, the ray tracing may be performed in real-time. In one embodiment, the light field for a scene may include one or more vectors that describe an amount of light flowing in one or more directions through one or more points in space within the scene. For example, the light field for a scene may include a vector function that describe an amount of light flowing in every direction through every point in space within the scene. In another embodiment, the light field may include a plurality of light probes. In yet another embodiment, each light probe within the light field may store information about light reflected off surfaces within the scene. In still another embodiment, the light field may include an array of blocks (e.g., a plurality of texel blocks) representative of the light probes.

Further still, in one embodiment, each block within the array may include color texture information and visibility texture information. For example, the color texture information may include lighting color information within the block. In another example, the visibility texture information may include distance information (e.g., a distance to a closest object/surface within the block). In another embodiment, the light field may be computed utilizing a processor (e.g., a graphics processing unit (GPU), etc.).

Also, as shown in operation 106, the light field is compressed at the remote device to create a compressed light field data for the scene. In one embodiment, the remote device may compress the light field using a video encoding and/or video compression unit. For example, the unit may be located within a GPU.

In addition, in one embodiment, the light field may be compressed using one or more video compression algorithms/techniques. For example, the light field may be compressed using GPU-accelerated high dynamic range (HDR) video compression implemented via a predetermined video coding/compression standard. In another embodiment, temporal reuse may be implemented during the compression of the light field. For example, information from the compression of previously rendered scenes may be used during the compression of a current scene. In another example, only differences between the light field for the scene and a light field for a previous scene may be compressed/sent as the light field data.

In this way, temporal dependencies between consecutive scenes may be leveraged to reduce an amount of data needed to be compressed. This may increase compression performance (e.g., by decreasing a time needed to compress the light field) and may reduce an amount of data sent over a network to a client device when compared to current compression implementation methods that do not leverage temporal dependencies.

Furthermore, in one embodiment, the compression may account for a current user view within the scene. For example, a current user view may be received from a client device. In another example, only the portion of light field that is within the current user view may be computed. In yet another example, only the portion of the computed light field that is within the potentially visible current user view may be compressed to create the compressed light field data. This may reduce an amount of data that is being compressed, which may further improve the performance of the system performing the compression, and may further reduce an amount of compressed data sent over a network to a client device.

Further still, as shown in operation 108, the compressed light field data is sent from the remote device to a client device. In one embodiment, the compressed light field data may be sent (e.g., streamed, etc.) from the remote device to the client device via one or more wired and/or wireless communication networks (e.g., a wireless internet connection, a cellular communications network, etc.).

In this way, the compressed light field data may be computed remotely and may be provided to the client device, where the client device may decompress the compressed light field data to obtain a decompressed light field for the scene. This decompressed light field may be used by the client device to perform global illumination for the scene at the client device. Implementing temporal reuse during the compression of the light field may reduce an amount of transmitted data/used bandwidth over communications networks, which may improve a performance of computing devices implementing communications over such networks. Such reuse may also result in a reduced latency of both the creation and transmission of the compressed light field data. Further, when computing the light field for the scene, lighting calculations may be computed dynamically and may not rely on static scenes or static lighting. This may effectively account for dynamic changes in scene geometry and lighting, and may improve a quality of the rendered result.

Also, as shown in operation 110, the compressed light field data for the scene is received at the client device. In one embodiment, the compressed light field data may be received from the remote device at the client device via one or more wired and/or wireless communication networks (e.g., a wireless internet connection, a cellular communications network, etc.).

Additionally, in one embodiment, the client device may include a device for at least partially rendering a scene and displaying the rendered scene. In another embodiment, the client device may include a mobile device (e.g., a smartphone, a tablet, etc.), a portable gaming platform, a virtual reality (VR) headset, etc.

Further, as shown in operation 112, the compressed light field data is decompressed at the client device to obtain the light field for the scene. In one embodiment, the client device may decompress the compressed light field data using a video decoder and/or video decompression unit. In another embodiment, the video decoder and/or video decompression unit may include a dedicated hardware unit within the client device. In yet another embodiment, the video decoder and/or video decompression unit may be located within a GPU of the client device. In another embodiment, light field data for previous scenes may be combined with the decompressed light field data to obtain the light field for the current scene.

Further still, as shown in operation 114, global illumination is computed for the scene at the client device, using the light field for the scene. In one embodiment, the client device may perform lookups within the light field when computing global illumination (e.g., instead of performing ray tracing or other resource-intensive actions, etc.). In another embodiment, performing global illumination may include modeling indirect light (e.g., how light is reflected off of surfaces onto other surfaces within the scene) as well as direct light (e.g., light that hits a surface directly from a light source).

Also, in one embodiment, the computed global illumination may be used to render the scene at the client device. In another embodiment, the rendered scene may be displayed by the client device (e.g., utilizing a display of the client device, etc.).

In this way, the performance of global illumination for the scene may improve a realism of the scene as displayed by the client device. Additionally, global illumination may be performed in a more efficient manner utilizing light field lookups, which may reduce an amount of processing necessary at the client device. This may improve a performance of the client device while rendering the scene, and may result in a high-quality, dynamic rendered image with low bandwidth usage.

Figure 2:
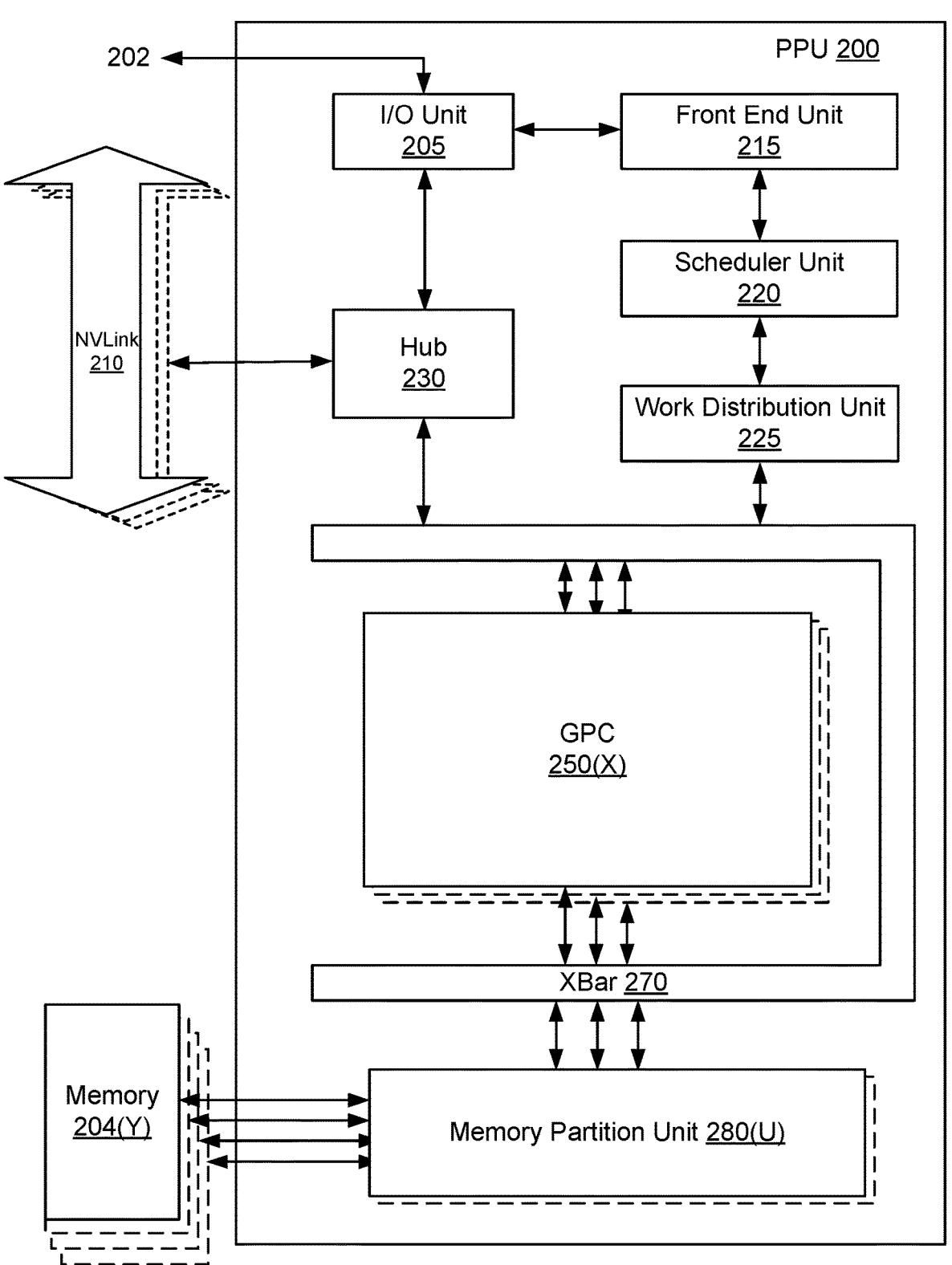
FIG. 2 illustrates a parallel processing unit, in accordance with an embodiment.

In yet another embodiment, one or more portions of the light field calculation and compression may be performed utilizing a parallel processing unit (PPU) such as the PPU 200 illustrated in FIG. 2.

More illustrative information will now be set forth regarding various optional architectures and features with which the foregoing framework may be implemented, per the desires of the user. It should be strongly noted that the following information is set forth for illustrative purposes and should not be construed as limiting in any manner. Any of the following features may be optionally incorporated with or without the exclusion of other features described.

Parallel Processing Architecture

FIG. 2 illustrates a parallel processing unit (PPU) 200, in accordance with an embodiment. In an embodiment, the PPU 200 is a multi-threaded processor that is implemented on one or more integrated circuit devices. The PPU 200 is a latency hiding architecture designed to process many threads in parallel. A thread (i.e., a thread of execution) is an instantiation of a set of instructions configured to be executed by the PPU 200. In an embodiment, the PPU 200 is a graphics processing unit (GPU) configured to implement a graphics rendering pipeline for processing three-dimensional (3D) graphics data in order to generate two-dimensional (2D) image data for display on a display device such as a liquid crystal display (LCD) device. In other embodiments, the PPU 200 may be utilized for performing general-purpose computations. While one exemplary parallel processor is provided herein for illustrative purposes, it should be strongly noted that such processor is set forth for illustrative purposes only, and that any processor may be employed to supplement and/or substitute for the same.

One or more PPUs 200 may be configured to accelerate thousands of High Performance Computing (HPC), data center, and machine learning applications. The PPU 200 may be configured to accelerate numerous deep learning systems and applications including autonomous vehicle platforms, deep learning, high-accuracy speech, image, and text recognition systems, intelligent video analytics, molecular simulations, drug discovery, disease diagnosis, weather forecasting, big data analytics, astronomy, molecular dynamics simulation, financial modeling, robotics, factory automation, real-time language translation, online search optimizations, and personalized user recommendations, and the like.

As shown in FIG. 2, the PPU 200 includes an Input/Output (I/O) unit 205, a front end unit 215, a scheduler unit 220, a work distribution unit 225, a hub 230, a crossbar (Xbar) 270, one or more general processing clusters (GPCs) 250, and one or more partition units 280. The PPU 200 may be connected to a host processor or other PPUs 200 via one or more high-speed NVLink 210 interconnect. The PPU 200 may be connected to a host processor or other peripheral devices via an interconnect 202. The PPU 200 may also be connected to a local memory comprising a number of memory devices 204. In an embodiment, the local memory may comprise a number of dynamic random access memory (DRAM) devices. The DRAM devices may be configured as a high-bandwidth memory (HBM) subsystem, with multiple DRAM dies stacked within each device.

The NVLink 210 interconnect enables systems to scale and include one or more PPUs 200 combined with one or more CPUs, supports cache coherence between the PPUs 200 and CPUs, and CPU mastering. Data and/or commands may be transmitted by the NVLink 210 through the hub 230 to/from other units of the PPU 200 such as one or more copy engines, a video encoder, a video decoder, a power management unit, etc. (not explicitly shown). The NVLink 210 is described in more detail in conjunction with FIG. 4B.

The I/O unit 205 is configured to transmit and receive communications (i.e., commands, data, etc.) from a host processor (not shown) over the interconnect 202. The I/O unit 205 may communicate with the host processor directly via the interconnect 202 or through one or more intermediate devices such as a memory bridge. In an embodiment, the I/O unit 205 may communicate with one or more other processors, such as one or more the PPUs 200 via the interconnect 202. In an embodiment, the I/O unit 205 implements a Peripheral Component Interconnect Express (PCIe) interface for communications over a PCIe bus and the interconnect 202 is a PCIe bus. In alternative embodiments, the I/O unit 205 may implement other types of well-known interfaces for communicating with external devices.

The I/O unit 205 decodes packets received via the interconnect 202. In an embodiment, the packets represent commands configured to cause the PPU 200 to perform various operations. The I/O unit 205 transmits the decoded commands to various other units of the PPU 200 as the commands may specify. For example, some commands may be transmitted to the front end unit 215. Other commands may be transmitted to the hub 230 or other units of the PPU 200 such as one or more copy engines, a video encoder, a video decoder, a power management unit, etc. (not explicitly shown). In other words, the I/O unit 205 is configured to route communications between and among the various logical units of the PPU 200.

In an embodiment, a program executed by the host processor encodes a command stream in a buffer that provides workloads to the PPU 200 for processing. A workload may comprise several instructions and data to be processed by those instructions. The buffer is a region in a memory that is accessible (i.e., read/write) by both the host processor and the PPU 200. For example, the I/O unit 205 may be configured to access the buffer in a system memory connected to the interconnect 202 via memory requests transmitted over the interconnect 202. In an embodiment, the host processor writes the command stream to the buffer and then transmits a pointer to the start of the command stream to the PPU 200. The front end unit 215 receives pointers to one or more command streams. The front end unit 215 manages the one or more streams, reading commands from the streams and forwarding commands to the various units of the PPU 200.

The front end unit 215 is coupled to a scheduler unit 220 that configures the various GPCs 250 to process tasks defined by the one or more streams. The scheduler unit 220 is configured to track state information related to the various tasks managed by the scheduler unit 220. The state may indicate which GPC 250 a task is assigned to, whether the task is active or inactive, a priority level associated with the task, and so forth. The scheduler unit 220 manages the execution of a plurality of tasks on the one or more GPCs 250.

The scheduler unit 220 is coupled to a work distribution unit 225 that is configured to dispatch tasks for execution on the GPCs 250. The work distribution unit 225 may track a number of scheduled tasks received from the scheduler unit 220. In an embodiment, the work distribution unit 225 manages a pending task pool and an active task pool for each of the GPCs 250. The pending task pool may comprise a number of slots (e.g., 32 slots) that contain tasks assigned to be processed by a particular GPC 250. The active task pool may comprise a number of slots (e.g., 4 slots) for tasks that are actively being processed by the GPCs 250. As a GPC 250 finishes the execution of a task, that task is evicted from the active task pool for the GPC 250 and one of the other tasks from the pending task pool is selected and scheduled for execution on the GPC 250. If an active task has been idle on the GPC 250, such as while waiting for a data dependency to be resolved, then the active task may be evicted from the GPC 250 and returned to the pending task pool while another task in the pending task pool is selected and scheduled for execution on the GPC 250.

The work distribution unit 225 communicates with the one or more GPCs 250 via XBar 270. The XBar 270 is an interconnect network that couples many of the units of the PPU 200 to other units of the PPU 200. For example, the XBar 270 may be configured to couple the work distribution unit 225 to a particular GPC 250. Although not shown explicitly, one or more other units of the PPU 200 may also be connected to the XBar 270 via the hub 230.

The tasks are managed by the scheduler unit 220 and dispatched to a GPC 250 by the work distribution unit 225. The GPC 250 is configured to process the task and generate results. The results may be consumed by other tasks within the GPC 250, routed to a different GPC 250 via the XBar 270, or stored in the memory 204. The results can be written to the memory 204 via the partition units 280, which implement a memory interface for reading and writing data to/from the memory 204. The results can be transmitted to another PPU 200 or CPU via the NVLink 210. In an embodiment, the PPU 200 includes a number U of partition units 280 that is equal to the number of separate and distinct memory devices 204 coupled to the PPU 200. A partition unit 280 will be described in more detail below in conjunction with FIG. 3B.

In an embodiment, a host processor executes a driver kernel that implements an application programming interface (API) that enables one or more applications executing on the host processor to schedule operations for execution on the PPU 200. In an embodiment, multiple compute applications are simultaneously executed by the PPU 200 and the PPU 200 provides isolation, quality of service (QoS), and independent address spaces for the multiple compute applications. An application may generate instructions (i.e., API calls) that cause the driver kernel to generate one or more tasks for execution by the PPU 200. The driver kernel outputs tasks to one or more streams being processed by the PPU 200. Each task may comprise one or more groups of related threads, referred to herein as a warp. In an embodiment, a warp comprises 32 related threads that may be executed in parallel. Cooperating threads may refer to a plurality of threads including instructions to perform the task and that may exchange data through shared memory. Threads and cooperating threads are described in more detail in conjunction with FIG. 4A.

Figure 3A:
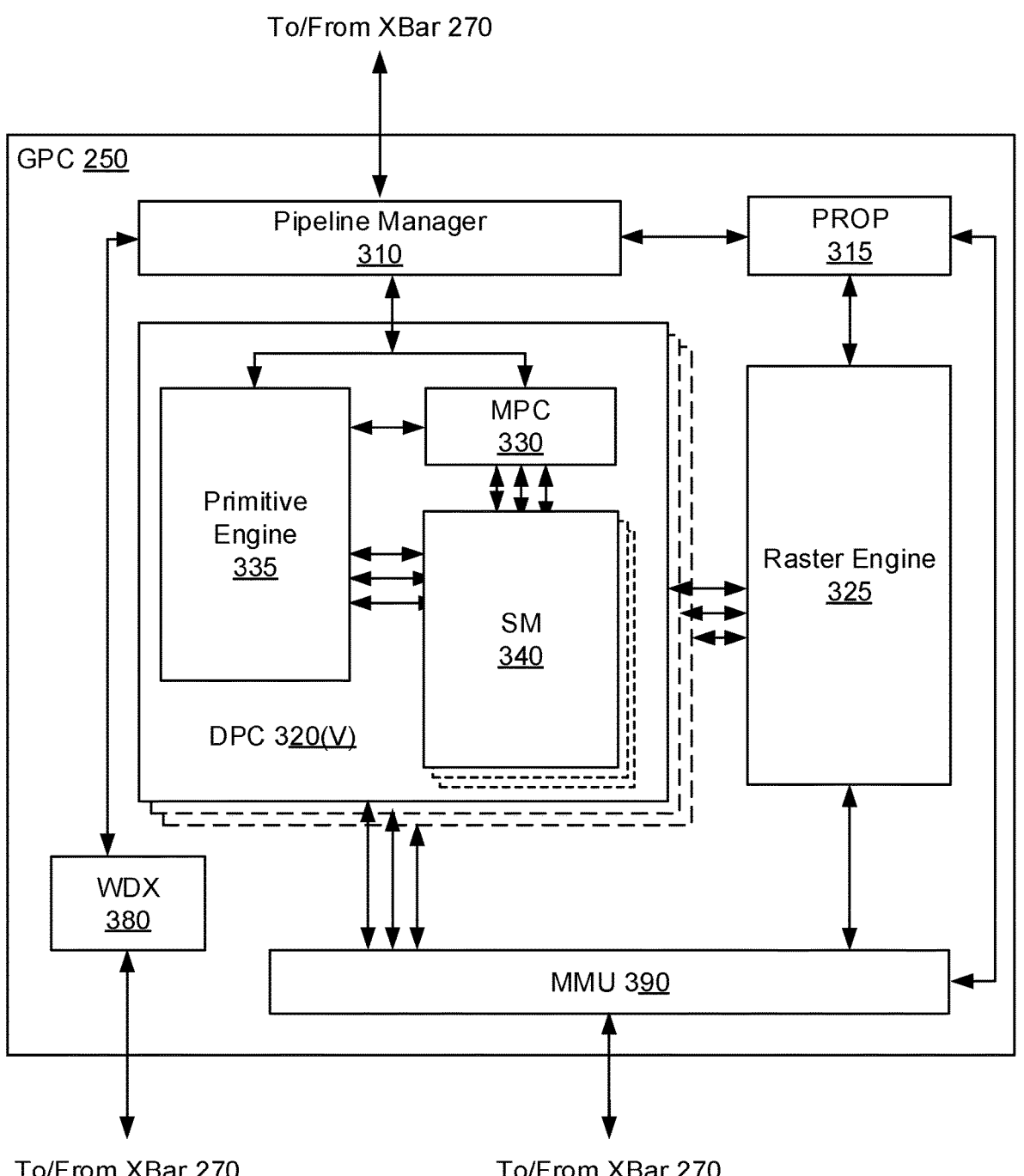
FIG. 3A illustrates a general processing cluster within the parallel processing unit of FIG. 2, in accordance with an embodiment.

FIG. 3A illustrates a GPC 250 of the PPU 200 of FIG. 2, in accordance with an embodiment. As shown in FIG. 3A, each GPC 250 includes a number of hardware units for processing tasks. In an embodiment, each GPC 250 includes a pipeline manager 310, a pre-raster operations unit (PROP) 315, a raster engine 325, a work distribution crossbar (WDX) 380, a memory management unit (MMU) 390, and one or more Data Processing Clusters (DPCs) 320. It will be appreciated that the GPC 250 of FIG. 3A may include other hardware units in lieu of or in addition to the units shown in FIG. 3A.

In an embodiment, the operation of the GPC 250 is controlled by the pipeline manager 310. The pipeline manager 310 manages the configuration of the one or more DPCs 320 for processing tasks allocated to the GPC 250. In an embodiment, the pipeline manager 310 may configure at least one of the one or more DPCs 320 to implement at least a portion of a graphics rendering pipeline. For example, a DPC 320 may be configured to execute a vertex shader program on the programmable streaming multiprocessor (SM) 340. The pipeline manager 310 may also be configured to route packets received from the work distribution unit 225 to the appropriate logical units within the GPC 250. For example, some packets may be routed to fixed function hardware units in the PROP 315 and/or raster engine 325 while other packets may be routed to the DPCs 320 for processing by the primitive engine 335 or the SM 340. In an embodiment, the pipeline manager 310 may configure at least one of the one or more DPCs 320 to implement a neural network model and/or a computing pipeline.

Figure 3B:
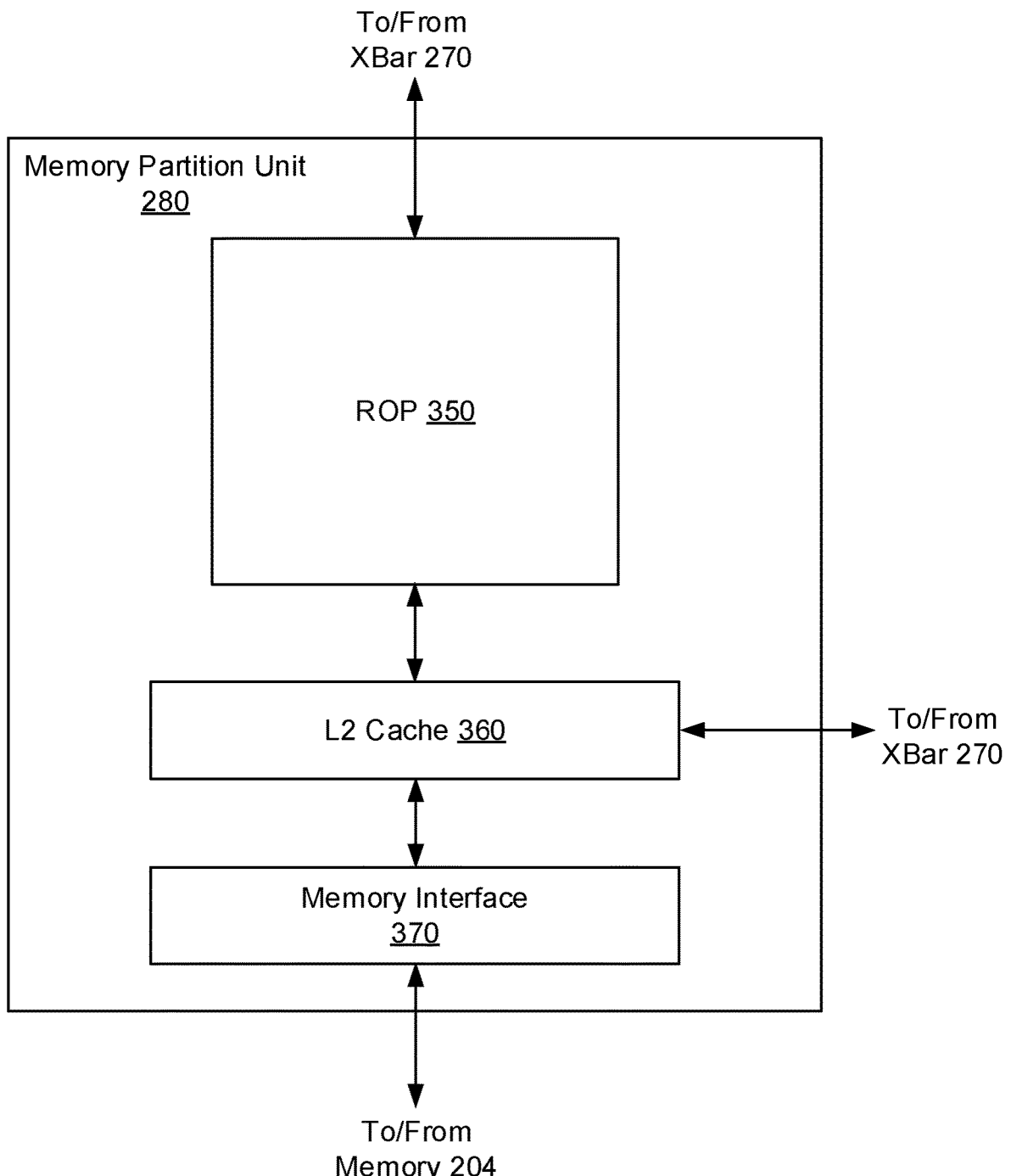
FIG. 3B illustrates a memory partition unit of the parallel processing unit of FIG. 2, in accordance with an embodiment.

The PROP unit 315 is configured to route data generated by the raster engine 325 and the DPCs 320 to a Raster Operations (ROP) unit, described in more detail in conjunction with FIG. 3B. The PROP unit 315 may also be configured to perform optimizations for color blending, organize pixel data, perform address translations, and the like.

The raster engine 325 includes a number of fixed function hardware units configured to perform various raster operations. In an embodiment, the raster engine 325 includes a setup engine, a coarse raster engine, a culling engine, a clipping engine, a fine raster engine, and a tile coalescing engine. The setup engine receives transformed vertices and generates plane equations associated with the geometric primitive defined by the vertices. The plane equations are transmitted to the coarse raster engine to generate coverage information (e.g., an x, y coverage mask for a tile) for the primitive. The output of the coarse raster engine is transmitted to the culling engine where fragments associated with the primitive that fail a z-test are culled, and transmitted to a clipping engine where fragments lying outside a viewing frustum are clipped. Those fragments that survive clipping and culling may be passed to the fine raster engine to generate attributes for the pixel fragments based on the plane equations generated by the setup engine. The output of the raster engine 325 comprises fragments to be processed, for example, by a fragment shader implemented within a DPC 320.

Each DPC 320 included in the GPC 250 includes an M-Pipe Controller (MPC) 330, a primitive engine 335, and one or more SMs 340. The MPC 330 controls the operation of the DPC 320, routing packets received from the pipeline manager 310 to the appropriate units in the DPC 320. For example, packets associated with a vertex may be routed to the primitive engine 335, which is configured to fetch vertex attributes associated with the vertex from the memory 204. In contrast, packets associated with a shader program may be transmitted to the SM 340.

The SM 340 comprises a programmable streaming processor that is configured to process tasks represented by a number of threads. Each SM 340 is multi-threaded and configured to execute a plurality of threads (e.g., 32 threads) from a particular group of threads concurrently. In an embodiment, the SM 340 implements a SIMD (Single-Instruction, Multiple-Data) architecture where each thread in a group of threads (i.e., a warp) is configured to process a different set of data based on the same set of instructions. All threads in the group of threads execute the same instructions. In another embodiment, the SM 340 implements a SIMT (Single-Instruction, Multiple Thread) architecture where each thread in a group of threads is configured to process a different set of data based on the same set of instructions, but where individual threads in the group of threads are allowed to diverge during execution. In an embodiment, a program counter, call stack, and execution state is maintained for each warp, enabling concurrency between warps and serial execution within warps when threads within the warp diverge. In another embodiment, a program counter, call stack, and execution state is maintained for each individual thread, enabling equal concurrency between all threads, within and between warps. When execution state is maintained for each individual thread, threads executing the same instructions may be converged and executed in parallel for maximum efficiency. The SM 340 will be described in more detail below in conjunction with FIG. 4A.

The MMU 390 provides an interface between the GPC 250 and the partition unit 280. The MMU 390 may provide translation of virtual addresses into physical addresses, memory protection, and arbitration of memory requests. In an embodiment, the MMU 390 provides one or more translation lookaside buffers (TLBs) for performing translation of virtual addresses into physical addresses in the memory 204.

FIG. 3B illustrates a memory partition unit 280 of the PPU 200 of FIG. 2, in accordance with an embodiment. As shown in FIG. 3B, the memory partition unit 280 includes a Raster Operations (ROP) unit 350, a level two (L2) cache 360, and a memory interface 370. The memory interface 370 is coupled to the memory 204. Memory interface 370 may implement 32, 64, 128, 1024-bit data buses, or the like, for high-speed data transfer. In an embodiment, the PPU 200 incorporates U memory interfaces 370, one memory interface 370 per pair of partition units 280, where each pair of partition units 280 is connected to a corresponding memory device 204. For example, PPU 200 may be connected to up to Y memory devices 204, such as high bandwidth memory stacks or graphics double-data-rate, version 5, synchronous dynamic random access memory, or other types of persistent storage.

In an embodiment, the memory interface 370 implements an HBM2 memory interface and Y equals half U. In an embodiment, the HBM2 memory stacks are located on the same physical package as the PPU 200, providing substantial power and area savings compared with conventional GDDR5 SDRAM systems. In an embodiment, each HBM2 stack includes four memory dies and Y equals 4, with HBM2 stack including two 128-bit channels per die for a total of 8 channels and a data bus width of 1024 bits.

In an embodiment, the memory 204 supports Single-Error Correcting Double-Error Detecting (SECDED) Error Correction Code (ECC) to protect data. ECC provides higher reliability for compute applications that are sensitive to data corruption. Reliability is especially important in large-scale cluster computing environments where PPUs 200 process very large datasets and/or run applications for extended periods.

In an embodiment, the PPU 200 implements a multi-level memory hierarchy. In an embodiment, the memory partition unit 280 supports a unified memory to provide a single unified virtual address space for CPU and PPU 200 memory, enabling data sharing between virtual memory systems. In an embodiment the frequency of accesses by a PPU 200 to memory located on other processors is traced to ensure that memory pages are moved to the physical memory of the PPU 200 that is accessing the pages more frequently. In an embodiment, the NVLink 210 supports address translation services allowing the PPU 200 to directly access a CPU's page tables and providing full access to CPU memory by the PPU 200.

In an embodiment, copy engines transfer data between multiple PPUs 200 or between PPUs 200 and CPUs. The copy engines can generate page faults for addresses that are not mapped into the page tables. The memory partition unit 280 can then service the page faults, mapping the addresses into the page table, after which the copy engine can perform the transfer. In a conventional system, memory is pinned (i.e., non-pageable) for multiple copy engine operations between multiple processors, substantially reducing the available memory. With hardware page faulting, addresses can be passed to the copy engines without worrying if the memory pages are resident, and the copy process is transparent.

Data from the memory 204 or other system memory may be fetched by the memory partition unit 280 and stored in the L2 cache 360, which is located on-chip and is shared between the various GPCs 250. As shown, each memory partition unit 280 includes a portion of the L2 cache 360 associated with a corresponding memory device 204. Lower level caches may then be implemented in various units within the GPCs 250. For example, each of the SMs 340 may implement a level one (L1) cache. The L1 cache is private memory that is dedicated to a particular SM 340. Data from the L2 cache 360 may be fetched and stored in each of the L1 caches for processing in the functional units of the SMs 340. The L2 cache 360 is coupled to the memory interface 370 and the XBar 270.

The ROP unit 350 performs graphics raster operations related to pixel color, such as color compression, pixel blending, and the like. The ROP unit 350 also implements depth testing in conjunction with the raster engine 325, receiving a depth for a sample location associated with a pixel fragment from the culling engine of the raster engine 325. The depth is tested against a corresponding depth in a depth buffer for a sample location associated with the fragment. If the fragment passes the depth test for the sample location, then the ROP unit 350 updates the depth buffer and transmits a result of the depth test to the raster engine 325. It will be appreciated that the number of partition units 280 may be different than the number of GPCs 250 and, therefore, each ROP unit 350 may be coupled to each of the GPCs 250. The ROP unit 350 tracks packets received from the different GPCs 250 and determines which GPC 250 that a result generated by the ROP unit 350 is routed to through the Xbar 270. Although the ROP unit 350 is included within the memory partition unit 280 in FIG. 3B, in other embodiment, the ROP unit 350 may be outside of the memory partition unit 280. For example, the ROP unit 350 may reside in the GPC 250 or another unit.

Figure 4A:
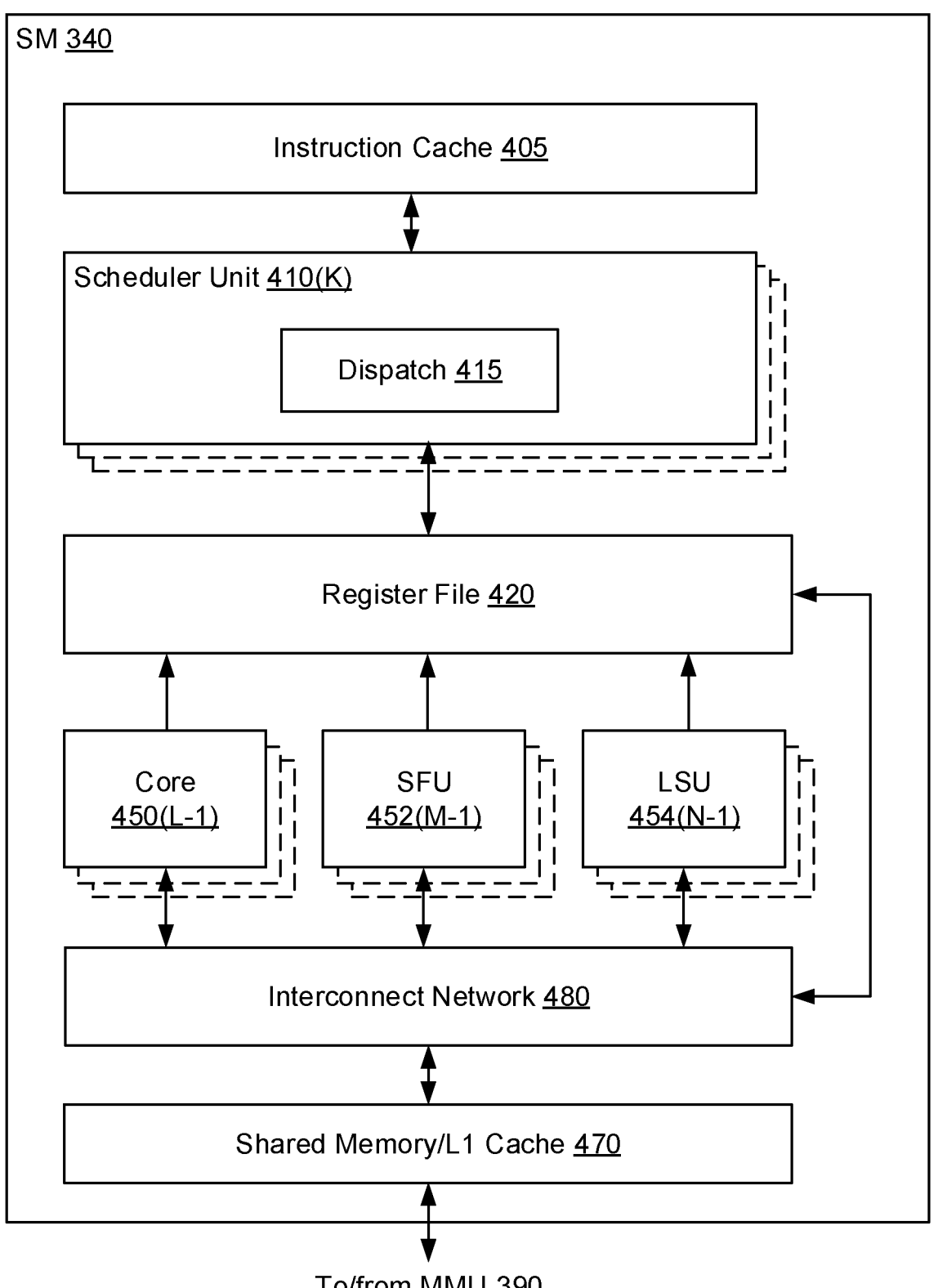
FIG. 4A illustrates the streaming multi-processor of FIG. 3A, in accordance with an embodiment.

FIG. 4A illustrates the streaming multi-processor 340 of FIG. 3A, in accordance with an embodiment. As shown in FIG. 4A, the SM 340 includes an instruction cache 405, one or more scheduler units 410(K), a register file 420, one or more processing cores 450, one or more special function units (SFUs) 452, one or more load/store units (LSUs) 454, an interconnect network 480, a shared memory/L1 cache 470.

As described above, the work distribution unit 225 dispatches tasks for execution on the GPCs 250 of the PPU 200. The tasks are allocated to a particular DPC 320 within a GPC 250 and, if the task is associated with a shader program, the task may be allocated to an SM 340. The scheduler unit 410(K) receives the tasks from the work distribution unit 225 and manages instruction scheduling for one or more thread blocks assigned to the SM 340. The scheduler unit 410(K) schedules thread blocks for execution as warps of parallel threads, where each thread block is allocated at least one warp. In an embodiment, each warp executes 32 threads. The scheduler unit 410(K) may manage a plurality of different thread blocks, allocating the warps to the different thread blocks and then dispatching instructions from the plurality of different cooperative groups to the various functional units (i.e., cores 450, SFUs 452, and LSUs 454) during each clock cycle.

Cooperative Groups is a programming model for organizing groups of communicating threads that allows developers to express the granularity at which threads are communicating, enabling the expression of richer, more efficient parallel decompositions. Cooperative launch APIs support synchronization amongst thread blocks for the execution of parallel algorithms. Conventional programming models provide a single, simple construct for synchronizing cooperating threads: a barrier across all threads of a thread block (i.e., the syncthreads( ) function). However, programmers would often like to define groups of threads at smaller than thread block granularities and synchronize within the defined groups to enable greater performance, design flexibility, and software reuse in the form of collective group-wide function interfaces.

Cooperative Groups enables programmers to define groups of threads explicitly at sub-block (i.e., as small as a single thread) and multi-block granularities, and to perform collective operations such as synchronization on the threads in a cooperative group. The programming model supports clean composition across software boundaries, so that libraries and utility functions can synchronize safely within their local context without having to make assumptions about convergence. Cooperative Groups primitives enable new patterns of cooperative parallelism, including producer-consumer parallelism, opportunistic parallelism, and global synchronization across an entire grid of thread blocks.

A dispatch unit 415 is configured to transmit instructions to one or more of the functional units. In the embodiment, the scheduler unit 410(K) includes two dispatch units 415 that enable two different instructions from the same warp to be dispatched during each clock cycle. In alternative embodiments, each scheduler unit 410(K) may include a single dispatch unit 415 or additional dispatch units 415.

Each SM 340 includes a register file 420 that provides a set of registers for the functional units of the SM 340. In an embodiment, the register file 420 is divided between each of the functional units such that each functional unit is allocated a dedicated portion of the register file 420. In another embodiment, the register file 420 is divided between the different warps being executed by the SM 340. The register file 420 provides temporary storage for operands connected to the data paths of the functional units.

Each SM 340 comprises L processing cores 450. In an embodiment, the SM 340 includes a large number (e.g., 128, etc.) of distinct processing cores 450. Each core 450 may include a fully-pipelined, single-precision, double-precision, and/or mixed precision processing unit that includes a floating point arithmetic logic unit and an integer arithmetic logic unit. In an embodiment, the floating point arithmetic logic units implement the IEEE 754-2008 standard for floating point arithmetic. In an embodiment, the cores 450 include 64 single-precision (32-bit) floating point cores, 64 integer cores, 32 double-precision (64-bit) floating point cores, and 8 tensor cores.

Tensor cores configured to perform matrix operations, and, in an embodiment, one or more tensor cores are included in the cores 450. In particular, the tensor cores are configured to perform deep learning matrix arithmetic, such as convolution operations for neural network training and inferencing. In an embodiment, each tensor core operates on a 4×4 matrix and performs a matrix multiply and accumulate operation D=A×B+C, where A, B, C, and D are 4×4 matrices.

In an embodiment, the matrix multiply inputs A and B are 16-bit floating point matrices, while the accumulation matrices C and D may be 16-bit floating point or 32-bit floating point matrices. Tensor Cores operate on 16-bit floating point input data with 32-bit floating point accumulation. The 16-bit floating point multiply requires 64 operations and results in a full precision product that is then accumulated using 32-bit floating point addition with the other intermediate products for a 4×4×4 matrix multiply. In practice, Tensor Cores are used to perform much larger two-dimensional or higher dimensional matrix operations, built up from these smaller elements. An API, such as CUDA 9 C++ API, exposes specialized matrix load, matrix multiply and accumulate, and matrix store operations to efficiently use Tensor Cores from a CUDA-C++ program. At the CUDA level, the warp-level interface assumes 16×16 size matrices spanning all 32 threads of the warp.

Each SM 340 also comprises M SFUs 452 that perform special functions (e.g., attribute evaluation, reciprocal square root, and the like). In an embodiment, the SFUs 452 may include a tree traversal unit configured to traverse a hierarchical tree data structure. In an embodiment, the SFUs 452 may include texture unit configured to perform texture map filtering operations. In an embodiment, the texture units are configured to load texture maps (e.g., a 2D array of texels) from the memory 204 and sample the texture maps to produce sampled texture values for use in shader programs executed by the SM 340. In an embodiment, the texture maps are stored in the shared memory/L1 cache 370. The texture units implement texture operations such as filtering operations using mip-maps (i.e., texture maps of varying levels of detail). In an embodiment, each SM 240 includes two texture units.

Each SM 340 also comprises N LSUs 454 that implement load and store operations between the shared memory/L1 cache 470 and the register file 420. Each SM 340 includes an interconnect network 480 that connects each of the functional units to the register file 420 and the LSU 454 to the register file 420, shared memory/L1 cache 470. In an embodiment, the interconnect network 480 is a crossbar that can be configured to connect any of the functional units to any of the registers in the register file 420 and connect the LSUs 454 to the register file and memory locations in shared memory/L1 cache 470.

The shared memory/L1 cache 470 is an array of on-chip memory that allows for data storage and communication between the SM 340 and the primitive engine 335 and between threads in the SM 340. In an embodiment, the shared memory/L1 cache 470 comprises 128 KB of storage capacity and is in the path from the SM 340 to the partition unit 280. The shared memory/L1 cache 470 can be used to cache reads and writes. One or more of the shared memory/L1 cache 470, L2 cache 360, and memory 204 are backing stores.

Combining data cache and shared memory functionality into a single memory block provides the best overall performance for both types of memory accesses. The capacity is usable as a cache by programs that do not use shared memory. For example, if shared memory is configured to use half of the capacity, texture and load/store operations can use the remaining capacity. Integration within the shared memory/L1 cache 470 enables the shared memory/L1 cache 470 to function as a high-throughput conduit for streaming data while simultaneously providing high-bandwidth and low-latency access to frequently reused data.

When configured for general purpose parallel computation, a simpler configuration can be used compared with graphics processing. Specifically, the fixed function graphics processing units shown in FIG. 2, are bypassed, creating a much simpler programming model. In the general purpose parallel computation configuration, the work distribution unit 225 assigns and distributes blocks of threads directly to the DPCs 320. The threads in a block execute the same program, using a unique thread ID in the calculation to ensure each thread generates unique results, using the SM 340 to execute the program and perform calculations, shared memory/L1 cache 470 to communicate between threads, and the LSU 454 to read and write global memory through the shared memory/L1 cache 470 and the memory partition unit 280. When configured for general purpose parallel computation, the SM 340 can also write commands that the scheduler unit 220 can use to launch new work on the DPCs 320.

The PPU 200 may be included in a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, and the like. In an embodiment, the PPU 200 is embodied on a single semiconductor substrate. In another embodiment, the PPU 200 is included in a system-on-a-chip (SoC) along with one or more other devices such as additional PPUs 200, the memory 204, a reduced instruction set computer (RISC) CPU, a memory management unit (MMU), a digital-to-analog converter (DAC), and the like.

In an embodiment, the PPU 200 may be included on a graphics card that includes one or more memory devices 204. The graphics card may be configured to interface with a PCIe slot on a motherboard of a desktop computer. In yet another embodiment, the PPU 200 may be an integrated graphics processing unit (iGPU) or parallel processor included in the chipset of the motherboard.

Exemplary Computing System

Systems with multiple GPUs and CPUs are used in a variety of industries as developers expose and leverage more parallelism in applications such as artificial intelligence computing. High-performance GPU-accelerated systems with tens to many thousands of compute nodes are deployed in data centers, research facilities, and supercomputers to solve ever larger problems. As the number of processing devices within the high-performance systems increases, the communication and data transfer mechanisms need to scale to support the increased bandwidth.

Figure 4B:
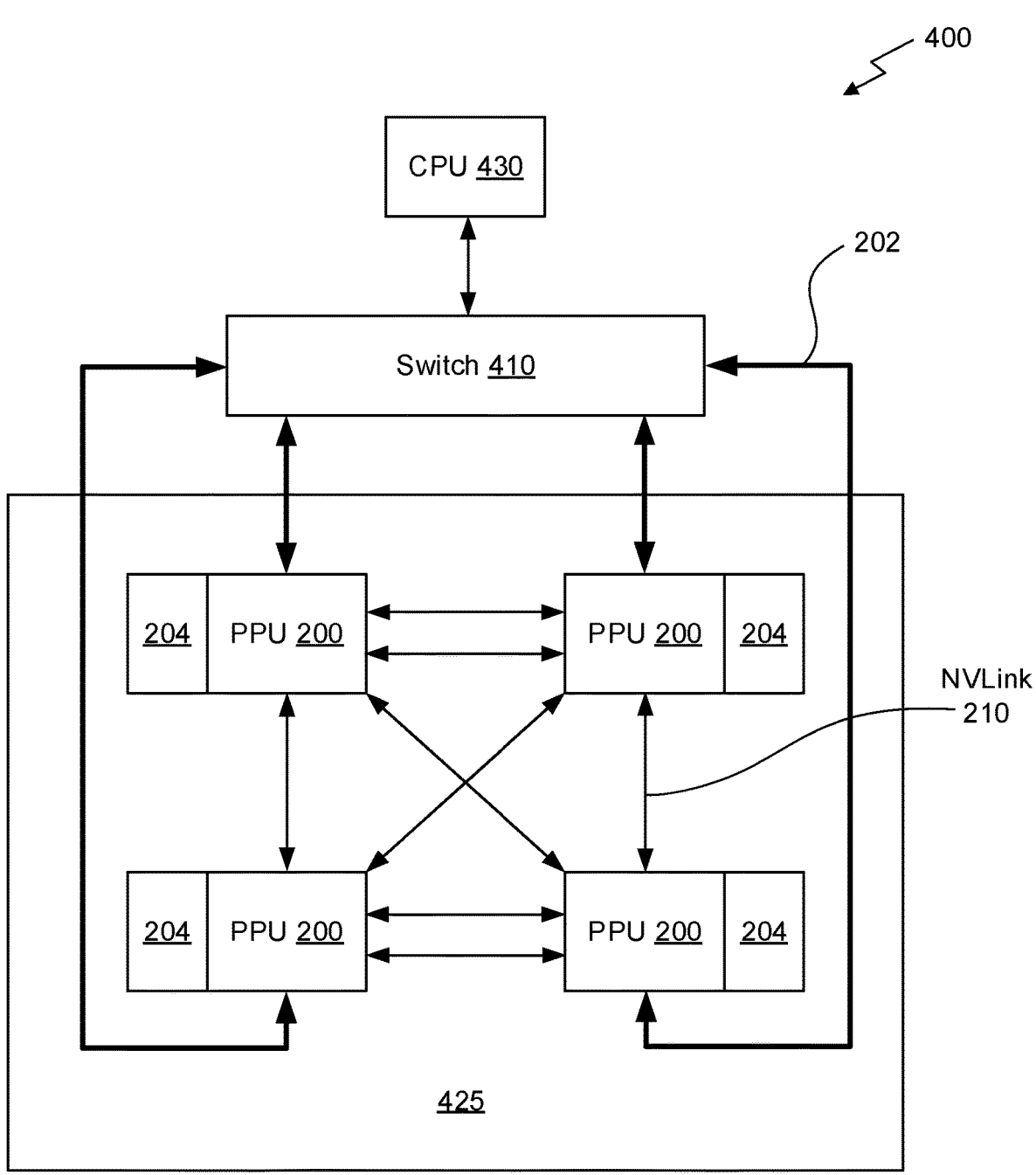
FIG. 4B is a conceptual diagram of a processing system implemented using the PPU of FIG. 2, in accordance with an embodiment.

FIG. 4B is a conceptual diagram of a processing system 400 implemented using the PPU 200 of FIG. 2, in accordance with an embodiment. The exemplary system 465 may be configured to implement the method 100 shown in FIG. 1. The processing system 400 includes a CPU 430, switch 410, and multiple PPUs 200 each and respective memories 204. The NVLink 210 provides high-speed communication links between each of the PPUs 200. Although a particular number of NVLink 210 and interconnect 202 connections are illustrated in FIG. 4B, the number of connections to each PPU 200 and the CPU 430 may vary. The switch 410 interfaces between the interconnect 202 and the CPU 430. The PPUs 200, memories 204, and NVLinks 210 may be situated on a single semiconductor platform to form a parallel processing module 425. In an embodiment, the switch 410 supports two or more protocols to interface between various different connections and/or links.

In another embodiment (not shown), the NVLink 210 provides one or more high-speed communication links between each of the PPUs 200 and the CPU 430 and the switch 410 interfaces between the interconnect 202 and each of the PPUs 200. The PPUs 200, memories 204, and interconnect 202 may be situated on a single semiconductor platform to form a parallel processing module 425. In yet another embodiment (not shown), the interconnect 202 provides one or more communication links between each of the PPUs 200 and the CPU 430 and the switch 410 interfaces between each of the PPUs 200 using the NVLink 210 to provide one or more high-speed communication links between the PPUs 200. In another embodiment (not shown), the NVLink 210 provides one or more high-speed communication links between the PPUs 200 and the CPU 430 through the switch 410. In yet another embodiment (not shown), the interconnect 202 provides one or more communication links between each of the PPUs 200 directly. One or more of the NVLink 210 high-speed communication links may be implemented as a physical NVLink interconnect or either an on-chip or on-die interconnect using the same protocol as the NVLink 210.

In the context of the present description, a single semiconductor platform may refer to a sole unitary semiconductor-based integrated circuit fabricated on a die or chip. It should be noted that the term single semiconductor platform may also refer to multi-chip modules with increased connectivity which simulate on-chip operation and make substantial improvements over utilizing a conventional bus implementation. Of course, the various circuits or devices may also be situated separately or in various combinations of semiconductor platforms per the desires of the user. Alternately, the parallel processing module 425 may be implemented as a circuit board substrate and each of the PPUs 200 and/or memories 204 may be packaged devices. In an embodiment, the CPU 430, switch 410, and the parallel processing module 425 are situated on a single semiconductor platform.

In an embodiment, the signaling rate of each NVLink 210 is 20 to 25 Gigabits/second and each PPU 200 includes six NVLink 210 interfaces (as shown in FIG. 4B, five NVLink 210 interfaces are included for each PPU 200). Each NVLink 210 provides a data transfer rate of 25 Gigabytes/second in each direction, with six links providing 300 Gigabytes/second. The NVLinks 210 can be used exclusively for PPU-to-PPU communication as shown in FIG. 4B, or some combination of PPU-to-PPU and PPU-to-CPU, when the CPU 430 also includes one or more NVLink 210 interfaces.

In an embodiment, the NVLink 210 allows direct load/store/atomic access from the CPU 430 to each PPU's 200 memory 204. In an embodiment, the NVLink 210 supports coherency operations, allowing data read from the memories 204 to be stored in the cache hierarchy of the CPU 430, reducing cache access latency for the CPU 430. In an embodiment, the NVLink 210 includes support for Address Translation Services (ATS), allowing the PPU 200 to directly access page tables within the CPU 430. One or more of the NVLinks 210 may also be configured to operate in a low-power mode.

Figure 4C:
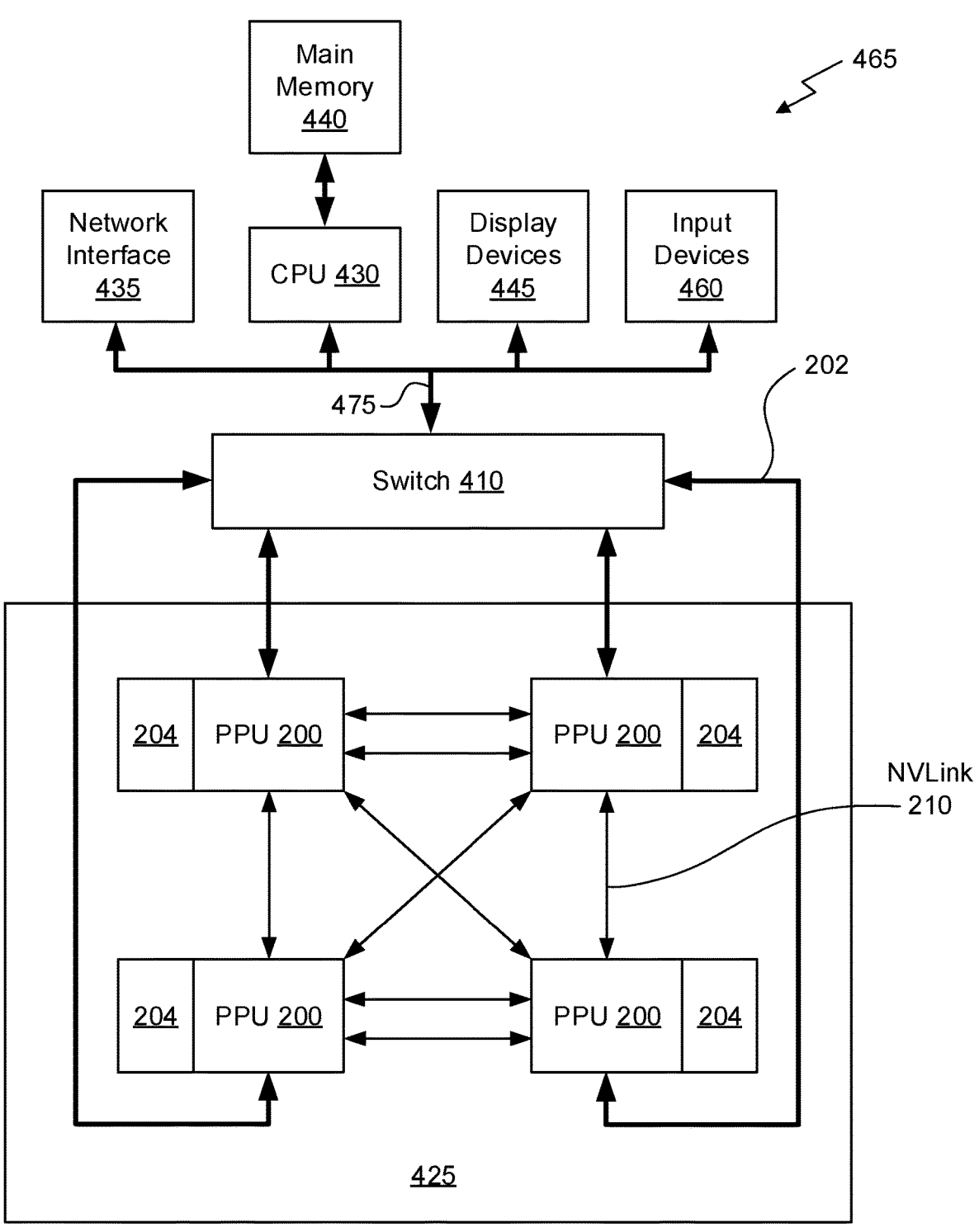
FIG. 4C illustrates an exemplary system in which the various architecture and/or functionality of the various previous embodiments may be implemented.

FIG. 4C illustrates an exemplary system 465 in which the various architecture and/or functionality of the various previous embodiments may be implemented. The exemplary system 465 may be configured to implement the method 100 shown in FIG. 1.

As shown, a system 465 is provided including at least one central processing unit 430 that is connected to a communication bus 475. The communication bus 475 may be implemented using any suitable protocol, such as PCI (Peripheral Component Interconnect), PCI-Express, AGP (Accelerated Graphics Port), HyperTransport, or any other bus or point-to-point communication protocol(s). The system 465 also includes a main memory 440. Control logic (software) and data are stored in the main memory 440 which may take the form of random access memory (RAM).

The system 465 also includes input devices 460, the parallel processing system 425, and display devices 445, i.e. a conventional CRT (cathode ray tube), LCD (liquid crystal display), LED (light emitting diode), plasma display or the like. User input may be received from the input devices 460, e.g., keyboard, mouse, touchpad, microphone, and the like. Each of the foregoing modules and/or devices may even be situated on a single semiconductor platform to form the system 465. Alternately, the various modules may also be situated separately or in various combinations of semiconductor platforms per the desires of the user.

Further, the system 465 may be coupled to a network (e.g., a telecommunications network, local area network (LAN), wireless network, wide area network (WAN) such as the Internet, peer-to-peer network, cable network, or the like) through a network interface 435 for communication purposes.

The system 465 may also include a secondary storage (not shown). The secondary storage includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 440 and/or the secondary storage. Such computer programs, when executed, enable the system 465 to perform various functions. The memory 440, the storage, and/or any other storage are possible examples of computer-readable media.

The architecture and/or functionality of the various previous figures may be implemented in the context of a general computer system, a circuit board system, a game console system dedicated for entertainment purposes, an application-specific system, and/or any other desired system. For example, the system 465 may take the form of a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, a mobile phone device, a television, workstation, game consoles, embedded system, and/or any other type of logic.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

Graphics Processing Pipeline

In an embodiment, the PPU 200 comprises a graphics processing unit (GPU). The PPU 200 is configured to receive commands that specify shader programs for processing graphics data. Graphics data may be defined as a set of primitives such as points, lines, triangles, quads, triangle strips, and the like. Typically, a primitive includes data that specifies a number of vertices for the primitive (e.g., in a model-space coordinate system) as well as attributes associated with each vertex of the primitive. The PPU 200 can be configured to process the graphics primitives to generate a frame buffer (i.e., pixel data for each of the pixels of the display).

An application writes model data for a scene (i.e., a collection of vertices and attributes) to a memory such as a system memory or memory 204. The model data defines each of the objects that may be visible on a display. The application then makes an API call to the driver kernel that requests the model data to be rendered and displayed. The driver kernel reads the model data and writes commands to the one or more streams to perform operations to process the model data. The commands may reference different shader programs to be implemented on the SMs 340 of the PPU 200 including one or more of a vertex shader, hull shader, domain shader, geometry shader, and a pixel shader. For example, one or more of the SMs 340 may be configured to execute a vertex shader program that processes a number of vertices defined by the model data. In an embodiment, the different SMs 340 may be configured to execute different shader programs concurrently. For example, a first subset of SMs 340 may be configured to execute a vertex shader program while a second subset of SMs 340 may be configured to execute a pixel shader program. The first subset of SMs 340 processes vertex data to produce processed vertex data and writes the processed vertex data to the L2 cache 360 and/or the memory 204. After the processed vertex data is rasterized (i.e., transformed from three-dimensional data into two-dimensional data in screen space) to produce fragment data, the second subset of SMs 340 executes a pixel shader to produce processed fragment data, which is then blended with other processed fragment data and written to the frame buffer in memory 204. The vertex shader program and pixel shader program may execute concurrently, processing different data from the same scene in a pipelined fashion until all of the model data for the scene has been rendered to the frame buffer. Then, the contents of the frame buffer are transmitted to a display controller for display on a display device.

Figure 5:
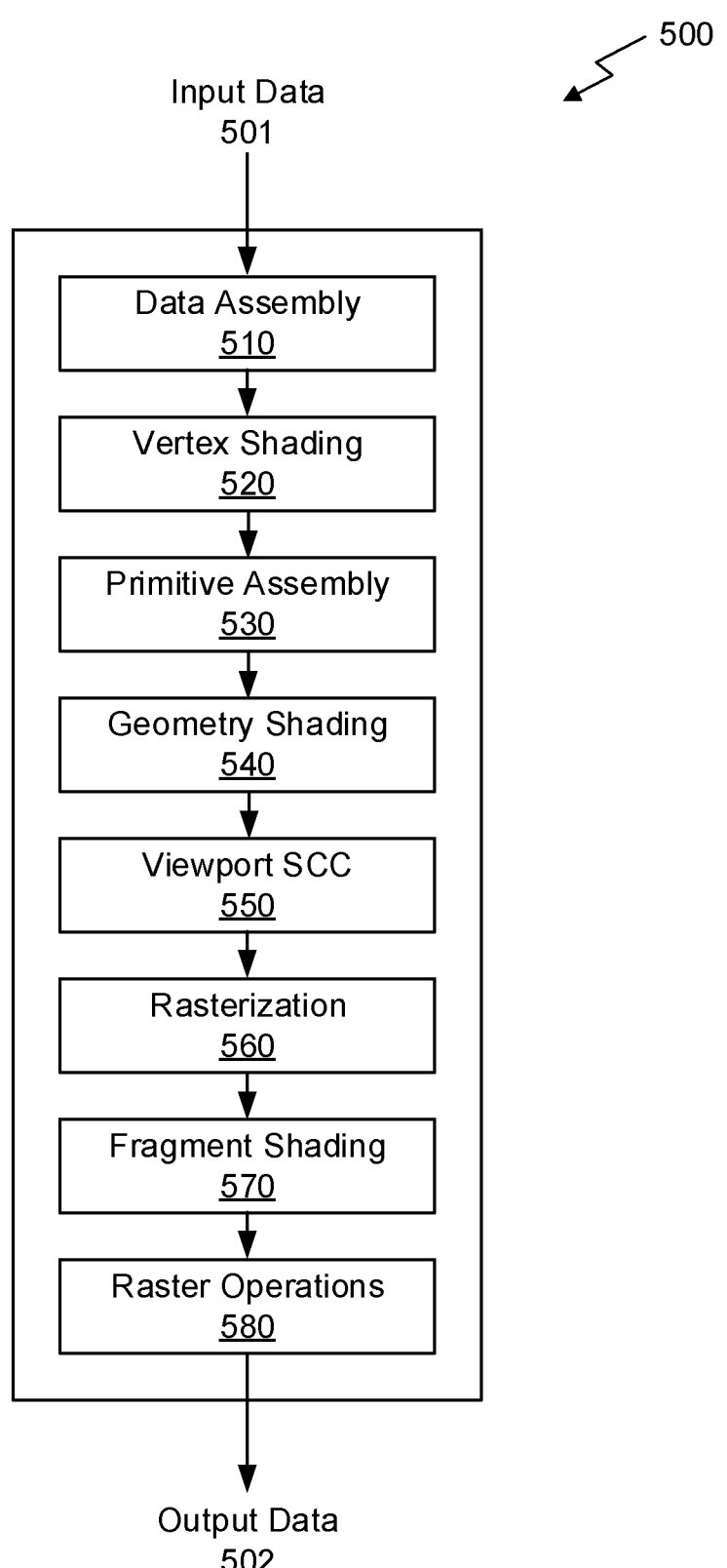
FIG. 5 is a conceptual diagram of a graphics processing pipeline implemented by the PPU of FIG. 2, in accordance with an embodiment.

FIG. 5 is a conceptual diagram of a graphics processing pipeline 500 implemented by the PPU 200 of FIG. 2, in accordance with an embodiment. The graphics processing pipeline 500 is an abstract flow diagram of the processing steps implemented to generate 2D computer-generated images from 3D geometry data. As is well-known, pipeline architectures may perform long latency operations more efficiently by splitting up the operation into a plurality of stages, where the output of each stage is coupled to the input of the next successive stage. Thus, the graphics processing pipeline 500 receives input data 501 that is transmitted from one stage to the next stage of the graphics processing pipeline 500 to generate output data 502. In an embodiment, the graphics processing pipeline 500 may represent a graphics processing pipeline defined by the OpenGL® API. As an option, the graphics processing pipeline 500 may be implemented in the context of the functionality and architecture of the previous Figures and/or any subsequent Figure(s).

As shown in FIG. 5, the graphics processing pipeline 500 comprises a pipeline architecture that includes a number of stages. The stages include, but are not limited to, a data assembly stage 510, a vertex shading stage 520, a primitive assembly stage 530, a geometry shading stage 540, a viewport scale, cull, and clip (VSCC) stage 550, a rasterization stage 560, a fragment shading stage 570, and a raster operations stage 580. In an embodiment, the input data 501 comprises commands that configure the processing units to implement the stages of the graphics processing pipeline 500 and geometric primitives (e.g., points, lines, triangles, quads, triangle strips or fans, etc.) to be processed by the stages. The output data 502 may comprise pixel data (i.e., color data) that is copied into a frame buffer or other type of surface data structure in a memory.

The data assembly stage 510 receives the input data 501 that specifies vertex data for high-order surfaces, primitives, or the like. The data assembly stage 510 collects the vertex data in a temporary storage or queue, such as by receiving a command from the host processor that includes a pointer to a buffer in memory and reading the vertex data from the buffer. The vertex data is then transmitted to the vertex shading stage 520 for processing.

The vertex shading stage 520 processes vertex data by performing a set of operations (i.e., a vertex shader or a program) once for each of the vertices. Vertices may be, e.g., specified as a 4-coordinate vector (i.e., <x, y, z, w>) associated with one or more vertex attributes (e.g., color, texture coordinates, surface normal, etc.). The vertex shading stage 520 may manipulate individual vertex attributes such as position, color, texture coordinates, and the like. In other words, the vertex shading stage 520 performs operations on the vertex coordinates or other vertex attributes associated with a vertex. Such operations commonly including lighting operations (i.e., modifying color attributes for a vertex) and transformation operations (i.e., modifying the coordinate space for a vertex). For example, vertices may be specified using coordinates in an object-coordinate space, which are transformed by multiplying the coordinates by a matrix that translates the coordinates from the object-coordinate space into a world space or a normalized-device-coordinate (NCD) space. The vertex shading stage 520 generates transformed vertex data that is transmitted to the primitive assembly stage 530.

The primitive assembly stage 530 collects vertices output by the vertex shading stage 520 and groups the vertices into geometric primitives for processing by the geometry shading stage 540. For example, the primitive assembly stage 530 may be configured to group every three consecutive vertices as a geometric primitive (i.e., a triangle) for transmission to the geometry shading stage 540. In some embodiments, specific vertices may be reused for consecutive geometric primitives (e.g., two consecutive triangles in a triangle strip may share two vertices). The primitive assembly stage 530 transmits geometric primitives (i.e., a collection of associated vertices) to the geometry shading stage 540.

The geometry shading stage 540 processes geometric primitives by performing a set of operations (i.e., a geometry shader or program) on the geometric primitives. Tessellation operations may generate one or more geometric primitives from each geometric primitive. In other words, the geometry shading stage 540 may subdivide each geometric primitive into a finer mesh of two or more geometric primitives for processing by the rest of the graphics processing pipeline 500. The geometry shading stage 540 transmits geometric primitives to the viewport SCC stage 550.

In an embodiment, the graphics processing pipeline 500 may operate within a streaming multiprocessor and the vertex shading stage 520, the primitive assembly stage 530, the geometry shading stage 540, the fragment shading stage 570, and/or hardware/software associated therewith, may sequentially perform processing operations. Once the sequential processing operations are complete, in an embodiment, the viewport SCC stage 550 may utilize the data. In an embodiment, primitive data processed by one or more of the stages in the graphics processing pipeline 500 may be written to a cache (e.g. L1 cache, a vertex cache, etc.). In this case, in an embodiment, the viewport SCC stage 550 may access the data in the cache. In an embodiment, the viewport SCC stage 550 and the rasterization stage 560 are implemented as fixed function circuitry.

The viewport SCC stage 550 performs viewport scaling, culling, and clipping of the geometric primitives. Each surface being rendered to is associated with an abstract camera position. The camera position represents a location of a viewer looking at the scene and defines a viewing frustum that encloses the objects of the scene. The viewing frustum may include a viewing plane, a rear plane, and four clipping planes. Any geometric primitive entirely outside of the viewing frustum may be culled (i.e., discarded) because the geometric primitive will not contribute to the final rendered scene. Any geometric primitive that is partially inside the viewing frustum and partially outside the viewing frustum may be clipped (i.e., transformed into a new geometric primitive that is enclosed within the viewing frustum. Furthermore, geometric primitives may each be scaled based on a depth of the viewing frustum. All potentially visible geometric primitives are then transmitted to the rasterization stage 560.

The rasterization stage 560 converts the 3D geometric primitives into 2D fragments (e.g. capable of being utilized for display, etc.). The rasterization stage 560 may be configured to utilize the vertices of the geometric primitives to setup a set of plane equations from which various attributes can be interpolated. The rasterization stage 560 may also compute a coverage mask for a plurality of pixels that indicates whether one or more sample locations for the pixel intercept the geometric primitive. In an embodiment, z-testing may also be performed to determine if the geometric primitive is occluded by other geometric primitives that have already been rasterized. The rasterization stage 560 generates fragment data (i.e., interpolated vertex attributes associated with a particular sample location for each covered pixel) that are transmitted to the fragment shading stage 570.

The fragment shading stage 570 processes fragment data by performing a set of operations (i.e., a fragment shader or a program) on each of the fragments. The fragment shading stage 570 may generate pixel data (i.e., color values) for the fragment such as by performing lighting operations or sampling texture maps using interpolated texture coordinates for the fragment. The fragment shading stage 570 generates pixel data that is transmitted to the raster operations stage 580.

The raster operations stage 580 may perform various operations on the pixel data such as performing alpha tests, stencil tests, and blending the pixel data with other pixel data corresponding to other fragments associated with the pixel. When the raster operations stage 580 has finished processing the pixel data (i.e., the output data 502), the pixel data may be written to a render target such as a frame buffer, a color buffer, or the like.

It will be appreciated that one or more additional stages may be included in the graphics processing pipeline 500 in addition to or in lieu of one or more of the stages described above. Various implementations of the abstract graphics processing pipeline may implement different stages. Furthermore, one or more of the stages described above may be excluded from the graphics processing pipeline in some embodiments (such as the geometry shading stage 540). Other types of graphics processing pipelines are contemplated as being within the scope of the present disclosure. Furthermore, any of the stages of the graphics processing pipeline 500 may be implemented by one or more dedicated hardware units within a graphics processor such as PPU 200. Other stages of the graphics processing pipeline 500 may be implemented by programmable hardware units such as the SM 340 of the PPU 200.

The graphics processing pipeline 500 may be implemented via an application executed by a host processor, such as a CPU. In an embodiment, a device driver may implement an application programming interface (API) that defines various functions that can be utilized by an application in order to generate graphical data for display. The device driver is a software program that includes a plurality of instructions that control the operation of the PPU 200. The API provides an abstraction for a programmer that lets a programmer utilize specialized graphics hardware, such as the PPU 200, to generate the graphical data without requiring the programmer to utilize the specific instruction set for the PPU 200. The application may include an API call that is routed to the device driver for the PPU 200. The device driver interprets the API call and performs various operations to respond to the API call. In some instances, the device driver may perform operations by executing instructions on the CPU. In other instances, the device driver may perform operations, at least in part, by launching operations on the PPU 200 utilizing an input/output interface between the CPU and the PPU 200. In an embodiment, the device driver is configured to implement the graphics processing pipeline 500 utilizing the hardware of the PPU 200.

Various programs may be executed within the PPU 200 in order to implement the various stages of the graphics processing pipeline 500. For example, the device driver may launch a kernel on the PPU 200 to perform the vertex shading stage 520 on one SM 340 (or multiple SMs 340). The device driver (or the initial kernel executed by the PPU 300) may also launch other kernels on the PPU 300 to perform other stages of the graphics processing pipeline 500, such as the geometry shading stage 540 and the fragment shading stage 570. In addition, some of the stages of the graphics processing pipeline 500 may be implemented on fixed unit hardware such as a rasterizer or a data assembler implemented within the PPU 300. It will be appreciated that results from one kernel may be processed by one or more intervening fixed function hardware units before being processed by a subsequent kernel on an SM 340.

Example Game Streaming System

Figure 6:
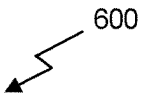
FIG. 6 is a block diagram of an example game streaming system suitable for use in implementing some embodiments of the present disclosure.
Figure 6:
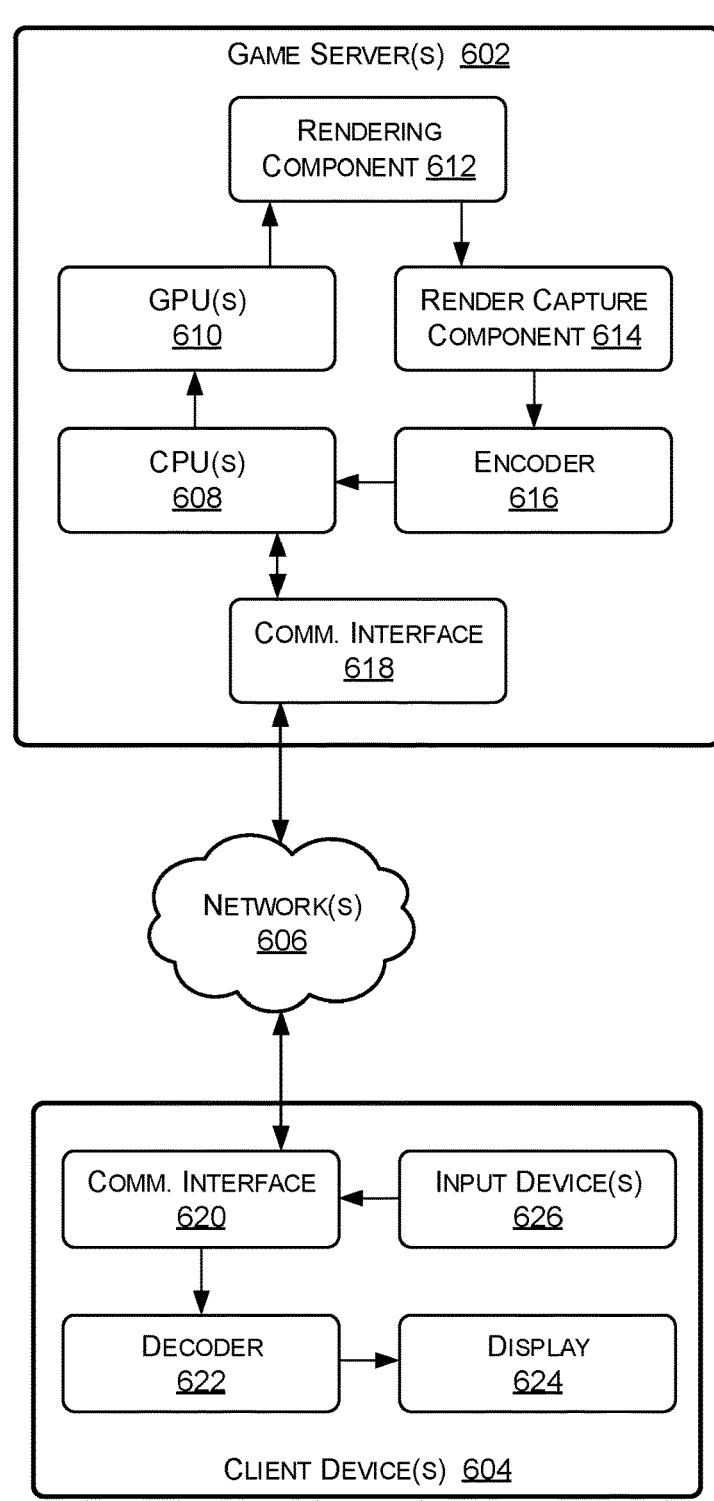

Now referring to FIG. 6, FIG. 6 is an example system diagram for a game streaming system 600, in accordance with some embodiments of the present disclosure. FIG. 6 includes game server(s) 602 (which may include similar components, features, and/or functionality to the example computing device 700 of FIG. 7), client device(s) 604 (which may include similar components, features, and/or functionality to the example computing device 700 of FIG. 7), and network(s) 606 (which may be similar to the network(s) described herein). In some embodiments of the present disclosure, the system 600 may be implemented.

In the system 600, for a game session, the client device(s) 604 may only receive input data in response to inputs to the input device(s), transmit the input data to the game server(s) 602, receive encoded display data from the game server(s) 602, and display the display data on the display 624. As such, the more computationally intense computing and processing is offloaded to the game server(s) 602 (e.g., rendering—in particular ray or path tracing—for graphical output of the game session is executed by the GPU(s) of the game server(s) 602). In other words, the game session is streamed to the client device(s) 604 from the game server(s) 602, thereby reducing the requirements of the client device(s) 604 for graphics processing and rendering.

For example, with respect to an instantiation of a game session, a client device 604 may be displaying a frame of the game session on the display 624 based on receiving display data from the game server(s) 602. The client device 604 may receive an input to one of the input device(s) and generate input data in response. The client device 604 may transmit the input data to the game server(s) 602 via the communication interface 620 and over the network(s) 606 (e.g., the Internet), and the game server(s) 602 may receive the input data via the communication interface 618. The CPU(s) may receive the input data, process the input data, and transmit data to the GPU(s) that causes the GPU(s) to generate a rendering of the game session. For example, the input data may be representative of a movement of a character of the user in a game, firing a weapon, reloading, passing a ball, turning a vehicle, etc. The rendering component 612 may render the game session (e.g., representative of the result of the input data) and the render capture component 614 may capture the rendering of the game session as display data (e.g., as image data capturing the rendered frame of the game session). The rendering of the game session may include ray or path-traced lighting and/or shadow effects, computed using one or more parallel processing units-such as GPUs, which may further employ the use of one or more dedicated hardware accelerators or processing cores to perform ray or path-tracing techniques—of the game server(s) 602. The encoder 616 may then encode the display data to generate encoded display data and the encoded display data may be transmitted to the client device 604 over the network(s) 606 via the communication interface 618. The client device 604 may receive the encoded display data via the communication interface 620 and the decoder 622 may decode the encoded display data to generate the display data. The client device 604 may then display the display data via the display 624.

Example Computing Device

Figure 7:
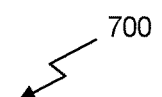
FIG. 7 is a block diagram of an example computing device suitable for use in implementing some embodiments of the present disclosure.
Figure 7:
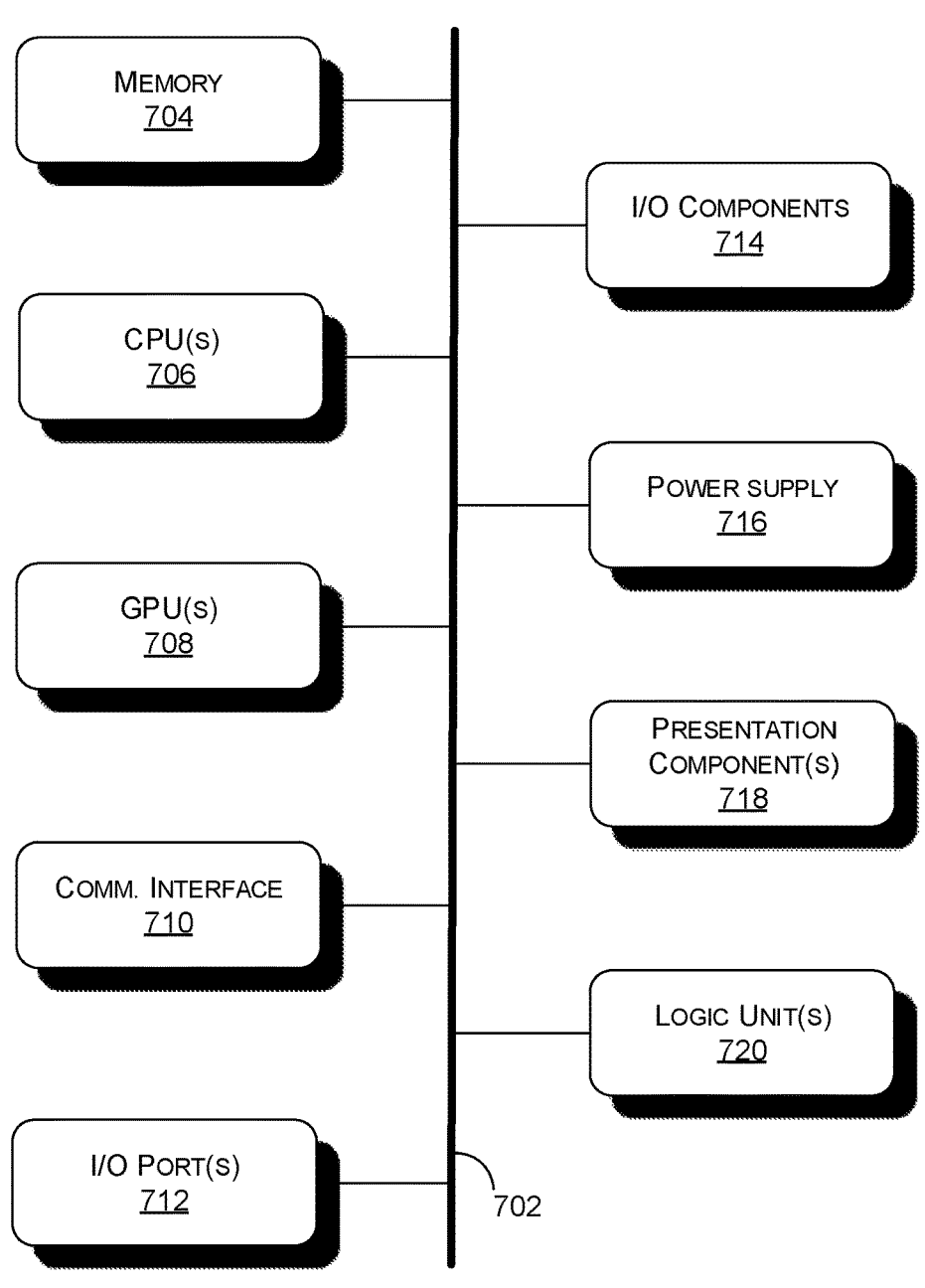

FIG. 7 is a block diagram of an example computing device(s) 700 suitable for use in implementing some embodiments of the present disclosure. Computing device 700 may include an interconnect system 702 that directly or indirectly couples the following devices: memory 704, one or more central processing units (CPUs) 706, one or more graphics processing units (GPUs) 708, a communication interface 710, input/output (I/O) ports 712, input/output components 714, a power supply 716, one or more presentation components 718 (e.g., display(s)), and one or more logic units 720.

Although the various blocks of FIG. 7 are shown as connected via the interconnect system 702 with lines, this is not intended to be limiting and is for clarity only. For example, in some embodiments, a presentation component 718, such as a display device, may be considered an I/O component 714 (e.g., if the display is a touch screen). As another example, the CPUs 706 and/or GPUs 708 may include memory (e.g., the memory 704 may be representative of a storage device in addition to the memory of the GPUs 708, the CPUs 706, and/or other components). In other words, the computing device of FIG. 7 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 7.

The interconnect system 702 may represent one or more links or busses, such as an address bus, a data bus, a control bus, or a combination thereof. The interconnect system 702 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 706 may be directly connected to the memory 704. Further, the CPU 706 may be directly connected to the GPU 708. Where there is direct, or point-to-point connection between components, the interconnect system 702 may include a PCIe link to carry out the connection. In these examples, a PCI bus need not be included in the computing device 700.

The memory 704 may include any of a variety of computer-readable media. The computer-readable media may be any available media that may be accessed by the computing device 700. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 704 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 700. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 706 may be configured to execute at least some of the computer-readable instructions to control one or more components of the computing device 700 to perform one or more of the methods and/or processes described herein. The CPU(s) 706 may each include one or more cores (e.g., one, two, four, eight, twenty-eight, seventy-two, etc.) that are capable of handling a multitude of software threads simultaneously. The CPU(s) 706 may include any type of processor, and may include different types of processors depending on the type of computing device 700 implemented (e.g., processors with fewer cores for mobile devices and processors with more cores for servers). For example, depending on the type of computing device 700, the processor may be an Advanced RISC Machines (ARM) processor implemented using Reduced Instruction Set Computing (RISC) or an x86 processor implemented using Complex Instruction Set Computing (CISC). The computing device 700 may include one or more CPUs 706 in addition to one or more microprocessors or supplementary co-processors, such as math co-processors.

In addition to or alternatively from the CPU(s) 706, the GPU(s) 708 may be configured to execute at least some of the computer-readable instructions to control one or more components of the computing device 700 to perform one or more of the methods and/or processes described herein. One or more of the GPU(s) 708 may be an integrated GPU (e.g., with one or more of the CPU(s) 706 and/or one or more of the GPU(s) 708 may be a discrete GPU. In embodiments, one or more of the GPU(s) 708 may be a coprocessor of one or more of the CPU(s) 706. The GPU(s) 708 may be used by the computing device 700 to render graphics (e.g., 3D graphics) or perform general purpose computations. For example, the GPU(s) 708 may be used for General-Purpose computing on GPUs (GPGPU). The GPU(s) 708 may include hundreds or thousands of cores that are capable of handling hundreds or thousands of software threads simultaneously. The GPU(s) 708 may generate pixel data for output images in response to rendering commands (e.g., rendering commands from the CPU(s) 706 received via a host interface). The GPU(s) 708 may include graphics memory, such as display memory, for storing pixel data or any other suitable data, such as GPGPU data. The display memory may be included as part of the memory 704. The GPU(s) 708 may include two or more GPUs operating in parallel (e.g., via a link). The link may directly connect the GPUs (e.g., using NVLINK) or may connect the GPUs through a switch (e.g., using NVSwitch). When combined together, each GPU 708 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 706 and/or the GPU(s) 708, the logic unit(s) 720 may be configured to execute at least some of the computer-readable instructions to control one or more components of the computing device 700 to perform one or more of the methods and/or processes described herein. In embodiments, the CPU(s) 706, the GPU(s) 708, and/or the logic unit(s) 720 may discretely or jointly perform any combination of the methods, processes and/or portions thereof. One or more of the logic units 720 may be part of and/or integrated in one or more of the CPU(s) 706 and/or the GPU(s) 708 and/or one or more of the logic units 720 may be discrete components or otherwise external to the CPU(s) 706 and/or the GPU(s) 708. In embodiments, one or more of the logic units 720 may be a coprocessor of one or more of the CPU(s) 706 and/or one or more of the GPU(s) 708.

Examples of the logic unit(s) 720 include one or more processing cores and/or components thereof, such as Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 710 may include one or more receivers, transmitters, and/or transceivers that enable the computing device 700 to communicate with other computing devices via an electronic communication network, included wired and/or wireless communications. The communication interface 710 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet.

The I/O ports 712 may enable the computing device 700 to be logically coupled to other devices including the I/O components 714, the presentation component(s) 718, and/or other components, some of which may be built in to (e.g., integrated in) the computing device 700. Illustrative I/O components 714 include a microphone, mouse, keyboard, joystick, game pad, game controller, satellite dish, scanner, printer, wireless device, etc. The I/O components 714 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 700. The computing device 700 may be include depth cameras, such as stereoscopic camera systems, infrared camera systems, RGB camera systems, touchscreen technology, and combinations of these, for gesture detection and recognition. Additionally, the computing device 700 may include accelerometers or gyroscopes (e.g., as part of an inertia measurement unit (IMU)) that enable detection of motion. In some examples, the output of the accelerometers or gyroscopes may be used by the computing device 700 to render immersive augmented reality or virtual reality.

The power supply 716 may include a hard-wired power supply, a battery power supply, or a combination thereof. The power supply 716 may provide power to the computing device 700 to enable the components of the computing device 700 to operate.

The presentation component(s) 718 may include a display (e.g., a monitor, a touch screen, a television screen, a heads-up-display (HUD), other display types, or a combination thereof), speakers, and/or other presentation components. The presentation component(s) 718 may receive data from other components (e.g., the GPU(s) 708, the CPU(s) 706, etc.), and output the data (e.g., as an image, video, sound, etc.).

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 700 of FIG. 7—e.g., each device may include similar components, features, and/or functionality of the computing device(s) 700.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device)

is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 700 described herein with respect to FIG. 7. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

Exemplary Distributed Computing Environment

Figure 8:
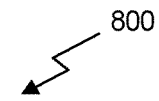
FIG. 8 illustrates an exemplary distributed rendering system, in accordance with one embodiment.
Figure 8:
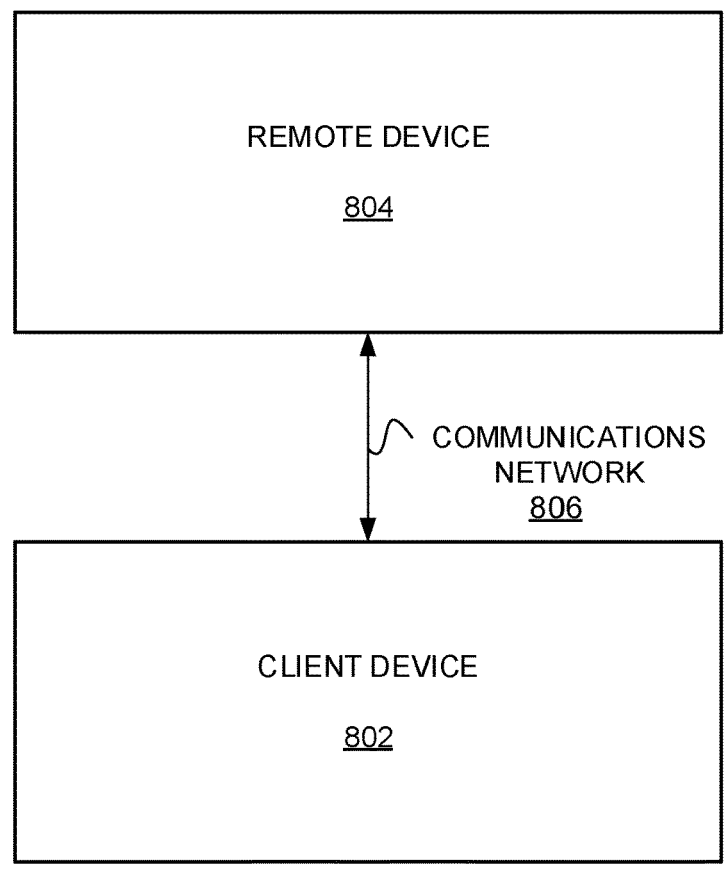

FIG. 8 illustrates an exemplary distributed rendering system 800 according to one exemplary embodiment. As shown, a client device 802 is in communication with a remote device 804 over a communications network 806. In one embodiment, the communications network 806 may include one or more wired and/or wireless communication networks.

Additionally, in one embodiment, a scene to be rendered may be received by the remote device 804. For example, the scene may include a scene within a video game being played by a user at the client device. In another example, game information (e.g., a user location within the game, a view of the user within the game, etc.) may be transmitted from the client device 802 to the remote device 804 over the communications network 806.

Further, in one embodiment, the remote device 804 may compute a light field for the scene, utilizing ray tracing. Additionally, the remote device 804 may compress the light field for the scene to create compressed light field data for the scene. For example, the light field may be compressed by the remote device 804 using one or more video compression algorithms/techniques that implement temporal reuse. In another example, the computation and compression of the light field may account for a current potentially visible user view within the scene provided to the remote device 804 from the client device 802.

Further still, in one embodiment, the remote device 804 may send the compressed light field data to the client device 802 over the communications network 806. The client device 802 may then decompress the compressed light field data, and may use the decompressed data to obtain the light field for the scene. The client device 802 may then compute global illumination values for the scene utilizing one or more lookups within the light field. The client device may then render the scene utilizing the computed global illumination values for the scene.

In this way, rendering duties may be divided between the client device 802 and the remote device 804, such that the remote device 804 performs more computationally-intensive rendering or ray tracing hardware dependent duties (e.g., ray tracing, light field calculation) in order to simplify/reduce the rendering duties performed at the client device (e.g., global illumination utilizing light field lookups), or to simplify/reduce ray tracing hardware dependencies at the client device. Also, by utilizing one or more video compression algorithms/techniques and accounting for a current user view within the scene during compression, the resulting compressed data may be minimized, which may reduce the amount of data transmitted over the communications network 806, and may reduce an overall latency of the system 800.

A Distributed, Decoupled System for Losslessly Streaming Dynamic Light Probes to Thin Clients Today's high-performance graphics systems for gaming with multiple GPUS, hardware-accelerated ray tracing, and efficient algorithms can approach cinematic rendering quality in real time using ray traced global illumination and provide interaction latency measured in milliseconds. These high-end systems set expectations which cannot be met on lower end consumer platforms that are constrained by thermal limits, battery power, and limited GPU feature sets.

Screen resolutions, refresh rates, and high dynamic range (HDR) color depth are increasing and XR applications require rendering multiple views. Advancing requirements may overwhelm current mobile processors used in untethered devices.

In one embodiment, global illumination (GI) data may be streamed from a cloud rendering server to thin clients. The streamed data enables dynamic, high quality, ray traced diffuse GI on thin clients with no ray tracing capabilities, at low computational cost. Efficient encoding and decoding hardware features may be used to achieve high compression ratios with low latency. Further, heuristic light probe update schemes may be used that may reduce the amount of data transferred within a GI update. As a result, in one embodiment, a single server may update (tens of) thousands of light probes per second, across multiple connected thin clients, amortizing the rendering costs.

Figure 9:
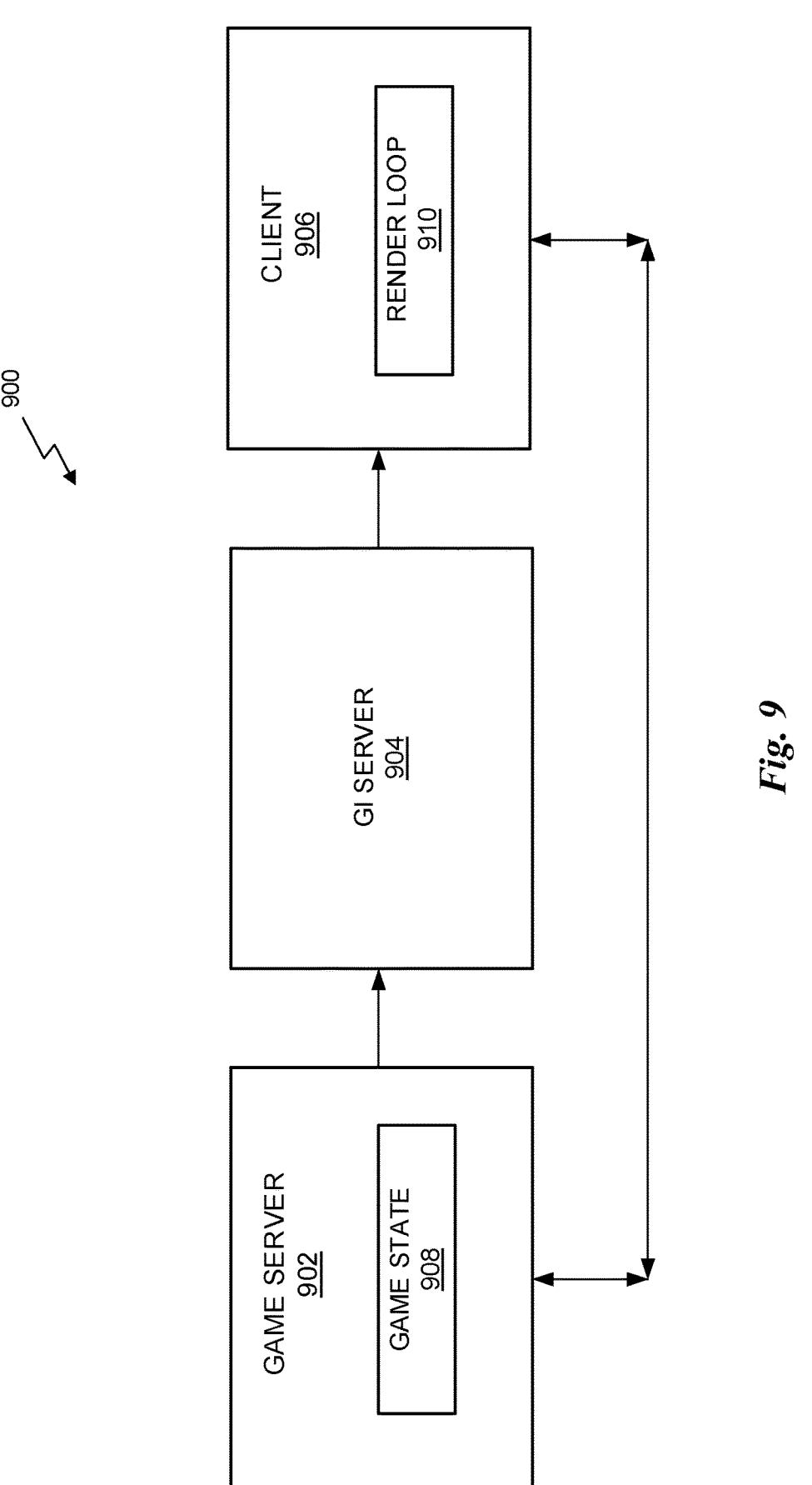
FIG. 9 illustrates an exemplary data flow, in accordance with one embodiment.

An exemplary light probe streaming pipeline may include the following 4 steps:
1. Server-side ray tracing of the light field (light probe volume)
2. Encoding the light probe data optimized for each client
3. Network transfer of encoded data to the client
4. Decoding the light probe data and rendering on the client FIG. 9 illustrates an exemplary data flow 900, according to one embodiment. A client-server architecture may distribute a graphics pipeline across one or more servers and one or more clients instead of streaming full video frames. The server, assumed to be in a data center in one embodiment, conceptually consists of two nodes interconnected with a high bandwidth link. The first node acts as a game server 902 to reliably receive user input from clients 906 and update the game state 908 accordingly. This is analogous to a standard multiplayer game server. The second node acts as a GI server 904 that performs ray tracing of light probe data and encodes it for client transport.

Any scene change is assumed to be reported to the GI server 904 by the game server 902 with negligible latency. Using the current scene state, the GI server 904 computes diffuse light probe texture data that is view-independent. As a result, this GI data can be used for multiple clients in multiplayer game scenarios, amortizing render costs. Hardware-accelerated video encoding is used on the server to compress the light probe data. The encoded data is transferred to the client 906 over a combination of WiFi, 5G, and/or wired connections using a reliable low latency network protocol.

On the client 906 side hardware video decoding is used (when available) for decompressing the light probe data with low latency. The client render loop 910 then uses the uncompressed light probe textures to add dynamic and high-quality diffuse GI at low computational cost. The GI texture decoding process is decoupled from the render loop and can happen at a completely different rate. This allows the client 906 to run at full frame rate resulting in minimal perceived latency on user input or movement. Input latency, as it occurs in traditional cloud-rendering solutions, is therefore avoided.

In one embodiment, GI data offers specific benefits when being rendered in the cloud: (1) diffuse GI is view-independent and used across multiple users and potentially multiple frames; (2) rendering GI data is computationally expensive which thin client hardware is not sufficient for; and (3) users are less sensitive to delayed diffuse lighting than view-dependent effects.

Uncompressed Light Probe Streaming

Streaming Probe Color

In one embodiment, a Dynamic Diffuse Global Illumination (DDGI) irradiance volume description may be used. Each probe may use a 10×10 texel array, with 32 bits of color per texel, to encode color data for each direction in form of an octahedral mapping. Thus, the required network throughput T color for updating any given N probes color probes, at a rate R color (in Hz), may be shown below:

$$T_{color} = R_{color} \times N_{probes} \times 3.125 \text{ kb} \qquad (1)$$

In one example, a 16×8×16 (2048) probe volume has a uncompressed DDGI color texture size is 6.25 Mb (0.78 MB). Updating 2048 uncompressed color probes at 10 Hz requires 62.5 Mbps of bandwidth.

Streaming Probe Visibility

In one embodiment, DDGI stores mean distance and mean squared-distance for each probe. During shading, these values are used to determine visibility weights between probes and shaded points using a Chebyshev statistical test. The mean distance/squared-distance data is referred to as "visibility data" and the texture itself is referred to as the "visibility texture." The visibility texture contains 18×18 texels per probe encoded as a pair of half-precision (16-bit) floating-point values (32 bits/texel). Thus the required throughput ($T_{visibility}$) for a visibility update rate of $R_{visibility}$ may be shown below:

$$T_{visibility} = R_{visibility} \times N_{probes} \times 10.125 \text{ kb} \qquad (2)$$

For the same probe volume as analyzed for color above (2048 probes), the size of the visibility texture is 3.24 times higher than that of the color texture, or 20.3 Mb (2.5 MB). Streaming the raw visibility texture at 10 Hz requires a throughput of 202.5 Mbps. The minimum required throughput for uncompressed color and visibility textures, updated at 10 Hz for 2048 probes, is 265 Mbps. These are exemplary bandwidth limitations, used when considering multiple thin-client devices in common current wireless networks. Though this naïve, uncompressed approach is lossless and maintains perfect probe "coherence", it requires unreasonably high network throughput as it sends all probe data regardless of whether the data is unchanged or likely to be used on the client. However, this throughput may be reduced.

Low-Latency Light Probe Compression

In one embodiment, GPU-accelerated high dynamic range (HDR) video compression is implemented using a predetermined video coding/compression standard. In another embodiment, hardware accelerated HDR 10 encoding and decoding may be implemented.

Encoding Color

In one embodiment, a method compresses color data as follows. Normalized color values are saved in A2RGB 10F texture (10 bits unsigned small floats for each color, 2 unused bits for alpha). As the unsigned small floats are normalized these values may be quantized, without loss, into 10-bit unsigned integer values in the range [0,1023]. One exemplary input format for the hardware encoder is 16 bit unsigned integers organized in 3 Y,U,V planes (linear Y-luma, U, V chrominance). The YUV444 surface format may be used to avoid chroma subsampling for lossless compression. In one embodiment, a hardware encoder uses only 10 out of 16 bits for color encoding. The remaining bits are reserved for future versions of the codec which support 12-bit and 16-bit color encoding. Therefore, these bits may be set to zero. The YUV tuples are then reordered into Y, U, V planes over which to apply hardware encoding. For decoding the process is performed in reverse.

Encoding Visibility

One solution for visibility relies on lossless and low bit depth video encoding. The idea is to distribute a single sixteen-bit floating point value across two adjacent 8-bit integer values. As the visibility texture for a light probe holds two channels (RG16F) the bits are distributed across four 8-bit integer values. If a utilized hardware encoder does not support four channel images, a sequence of three RG16F values may be packed into a sequence of four YUV values effectively distributing the bits into YUVY, UVYU, VYUV sequences. The YUV texture may be widened to allocate enough memory for the visibility texture. For an original light probe visibility texture width x the YUV texture width may be increased to $x' = \lceil 4/3 \cdot x' \rceil$.

Threaded Client-side Decoding

In order to maximize throughput and avoid CPU blocking behavior between rendering updates and decoding incoming texture updates, texture decode may occur in a separate thread on the client. This unblocks a game loop during CPU-based texture decoding or GPU decoding dispatch.

Selective Light Probe Updates

As a next step in optimizing network throughput consumption per GI update sending probes which do not contain information relevant to client-side shading may be avoided. A relevant probe satisfies the following three conditions:

1. It is being updated and used for shading in the scene
2. Its affiliated texels have changed significantly since its last transmitted update to a client
3. It is shading points potentially visible to a user On the server, all probes for which the preceding three conditions hold are gathered and transmitted to the client. At each transmission, transmitted probe data is recorded on the server and compared to rendered probe data to determine which probes should be sent in the next transmission.

Light Probe Repacking

Inactive probes may be removed from the original texture by moving to an index-based probe update system (selective, iterative) as opposed to a full texture transfer (global probe volume update). An additional reduction is possible for each core texel array in both color and visibility texture. The original DDGI textures include one-pixel guard bands (per probe) for texture filtering that contain redundant information from the core texel array. This data can be removed in the packing step on the server and reconstructed without loss on the client during unpacking. The strategy reduces the size of transferred textures resulting in a benefit independent of the compression scheme (or uncompressed transfer).

However, for temporal reuse, probe locations in the textures may be maintained over multiple frames if possible.

The index-based update scheme allows for the adjustment of the total packet size in flexible ways, as the number of iteratively updated probes can be specified. This effectively introduces a 'knob' to adjust throughput on a per-client basis.

Light Probe Update Textures

The following describes selective probe updates on the server and client(s).

The server stores permanent client probe textures as well as temporary selective probe update textures for each client. The permanent textures represent the state of probes as they exist on each client. The temporary probe update textures are created per update step and store the probe information that is being renewed. Along with this texture, the client may be informed of which probes in the volume are being updated. This information is provided by the probe index buffer which maps probe update texture coordinates into the client's probe textures. In comparison to the probe update textures, the size of the probe index buffer (encoded as a single two-byte unsigned integer per probe) is very small and is further reduced by delta encoding.

For the client this process happens in reverse order. Only those light probes that have been sent to the client are updated in the permanent probe texture. The mapping from the update texture to the permanent light probe texture uses the received and decompressed probe index buffer. The remaining texels are assumed valid from the previous state. As the texture decompression and update step happen asynchronously in a parallel thread, the render loop is not blocked and can continuously run at full frame rate.

Light Probe Change Thresholding

To conservatively estimate all probes that could affect the primary client view, all probes that have changed in value since the last time they were transmitted may be considered. Two additional textures per connected client may be maintained on the server, one for color and one for visibility, that store the state of each probe at the last time it was transmitted. At transmission time, each probe may be compared to its last transmitted state and may only be considered for transfer if its values changed beyond a specified threshold. Although higher thresholds might be perceptually tolerable, a probe may be marked as changed if it is not texel-for-texel identical to its last transmitted state. Fully-converged color on the server making scene changes may be assumed to be the only source of variance in the probe result. Before each probe is transmitted, its data may be written to the respective last-transmitted texture.

Server-Side Client View Probe Culling

Given a viewpoint within a scene, the subset of probe texels that might contribute to a rendered frame are only those which are close to points of primary visibility. This may represent a substantial reduction of the overall number of active/updating probes from the full volume.

By limiting updated probes to those which contribute to shading the primary visibility frustum, the number of probes required to be updated can be reduced. A game-dependent client view prediction scheme may adjust the number of updated probes. Such a prediction may be coupled to network latency and game content. A strategy that is application-independent may be implemented by estimating on the server the potential visible set (PVS) of probes contributing to client shading by rendering a spherical view from the position of the client. Gathering probes from this PVS estimation ensures correctness of the client view under camera rotation.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A method comprising:
receiving compressed light field data for a scene, wherein the compressed light field data is a compressed representation of a portion of a light field computed for the scene that is changed from a prior light field obtained for a previous scene;
receiving an indication of the portion of the light field that is included in the compressed light field data;
decompressing the compressed light field data to obtain the portion of the light field for the scene;
obtaining the light field for the scene by combining the portion of the light field for the scene with the prior light field obtained for the previous scene based on the indication;
computing global illumination for the scene, using the light field for the scene.

2. The method of claim 1, wherein the indication is received as an index buffer that maps coordinates of the portion of the light field to the prior light field obtained for the previous scene.

3. A method comprising:

receiving compressed light field data for a scene, wherein the compressed light field data is a compressed representation of a portion of a light field computed for the scene that is changed from a prior light field obtained for a previous scene, wherein the light field includes an array of blocks, each block in the array of blocks including color texture information and visibility texture information;

decompressing the compressed light field data to obtain the portion of the light field for the scene;

obtaining the light field for the scene by combining the portion of the light field for the scene with the prior light field obtained for the previous scene;

computing global illumination for the scene, using the light field for the scene.

4. The method of claim 3, wherein the compressed light field data is received from a remote device at a client device, where the remote device includes a node within a cloud-based computing environment, and the client device includes one or more of a mobile computing device, a portable gaming platform, and a virtual reality (VR) headset.

5. The method of claim 3, wherein the compressed light field data is received via one or more of a wireless internet connection and a cellular communications network.

6. The method of claim 3, wherein a client device decompresses the compressed light field data using a video decompression unit.

7. The method of claim 3, wherein a client device performs lookups within the light field for the scene when computing global illumination for the scene, instead of performing ray tracing.

8. The method of claim 3, further comprising rendering the scene at a client device, using the computed global illumination.

9. The method of claim 8, further comprising displaying the rendered scene by the client device.

10. The method of claim 3, wherein an indirect light model indicates light is reflected off of surfaces onto other surfaces within the scene.

11. The method of claim 3, wherein a direct light model indicates light that hits a surface directly from a light source.

12. The method of claim 3, wherein the color texture information includes lighting color information within the block.

13. The method of claim 3, wherein the visibility texture information includes a distance to a closest surface within the block.

14. The method of claim 3, wherein the scene and the previous scene are consecutive scenes to be rendered.

15. A non-transitory computer-readable storage medium storing instructions that, when executed by a processor, causes the processor to:

receiving compressed light field data for a scene, wherein the compressed light field data is a compressed representation of a portion of a light field computed for the scene that is changed from a prior light field obtained for a previous scene, wherein the light field includes an array of blocks, each block in the array of blocks including color texture information and visibility texture information;

decompressing the compressed light field data to obtain the portion of the light field for the scene;

obtaining the light field for the scene by combining the portion of the light field for the scene with the prior light field obtained for the previous scene; and computing global illumination for the scene, using the light field for the scene.

16. The non-transitory computer-readable storage medium of claim 15, wherein the compressed light field data is received from a remote device at a client device, where the remote device includes a node within a cloud-based computing environment, and the client device includes one or more of a mobile computing device, a portable gaming platform, and a virtual reality (VR) headset.

17. The non-transitory computer-readable storage medium of claim 15, wherein the compressed light field data is received via one or more of a wireless internet connection and a cellular communications network.

18. The non-transitory computer-readable storage medium of claim 15, wherein a client device decompresses the compressed light field data using a video decompression unit.

19. The non-transitory computer-readable storage medium of claim 15, wherein a client device performs lookups within the light field for the scene when computing global illumination for the scene, instead of performing ray tracing.

20. The non-transitory computer-readable storage medium of claim 15, wherein the steps further comprise rendering the scene at a client device, using the computed global illumination.

21. The non-transitory computer-readable storage medium of claim 20, wherein the steps further comprise displaying the rendered scene by the client device.

22. The non-transitory computer-readable storage medium of claim 15, wherein an indirect light model indicates light is reflected off of surfaces onto other surfaces within the scene.

23. The non-transitory computer-readable storage medium of claim 15, wherein a direct light model indicates light that hits a surface directly from a light source.

24. A system, comprising:

a non-transitory memory comprising instructions; and one or more processors in communication with the memory, wherein the one or more processors execute the instructions to:

receive compressed light field data for a scene, wherein the compressed light field data is a compressed representation of a portion of a light field computed for the scene that is changed from a prior light field obtained for a previous scene, wherein the light field includes an array of blocks, each block in the array of blocks including color texture information and visibility texture information;

decompress the compressed light field data to obtain the portion of the light field for the scene;

obtain the light field for the scene by combining the portion of the light field for the scene with the prior light field obtained for the previous scene; and compute global illumination for the scene, using the light field for the scene.

25. The system of claim 24, wherein the non-transitory memory and the one or more processors are components of a client device.

* * * * *